(12) United States Patent
Oda et al.

(10) Patent No.: US 8,598,271 B2
(45) Date of Patent: *Dec. 3, 2013

(54) BLOCK COPOLYMER COMPOSITION, FILM, AND METHOD FOR PRODUCING BLOCK COPOLYMER COMPOSITION

(75) Inventors: Ryouji Oda, Tokyo (JP); Takeshi Ooishi, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/141,950

(22) PCT Filed: Dec. 25, 2009

(86) PCT No.: PCT/JP2009/071692
§ 371 (c)(1),
(2), (4) Date: Jun. 23, 2011

(87) PCT Pub. No.: WO2010/074270
PCT Pub. Date: Jul. 1, 2010

(65) Prior Publication Data
US 2011/0257336 A1    Oct. 20, 2011

(30) Foreign Application Priority Data

Dec. 26, 2008   (JP) ................................ 2008-335329
Mar. 31, 2009   (JP) ................................ 2009-088533

(51) Int. Cl.
C08L 53/02    (2006.01)
C08F 295/00   (2006.01)

(52) U.S. Cl.
USPC .......................................... 525/89; 525/271

(58) Field of Classification Search
USPC ................................................. 525/89, 271
See application file for complete search history.

(56) References Cited

U.S. PATENT DOCUMENTS

| | | | |
|---|---|---|---|
| 4,104,327 A | 8/1978 | Inoue et al. | |
| 4,335,221 A | 6/1982 | Gerberding | |
| 4,386,125 A | 5/1983 | Shiraki et al. | |
| 4,699,938 A | 10/1987 | Minamizaki et al. | |
| 4,939,207 A | 7/1990 | Fasulo et al. | |
| 5,290,842 A | 3/1994 | Sasaki et al. | |
| 5,723,222 A | 3/1998 | Sato et al. | |
| 6,329,459 B1 | 12/2001 | Kang et al. | |
| 6,344,518 B1 | 2/2002 | Kobayashi et al. | |
| 6,531,263 B2 | 3/2003 | Knoll | |
| 6,593,430 B1 | 7/2003 | Knoll et al. | |
| 7,318,985 B2 | 1/2008 | Tsubaki et al. | |
| 2004/0242775 A1 | 12/2004 | Tahara et al. | |
| 2005/0009990 A1 | 1/2005 | Knoll et al. | |
| 2005/0233249 A1 | 10/2005 | Muldermans et al. | |
| 2006/0099373 A1 | 5/2006 | Dupont et al. | |
| 2006/0205874 A1 | 9/2006 | Uzee et al. | |
| 2006/0205877 A1 | 9/2006 | DuBois | |
| 2006/0235165 A1 | 10/2006 | Kawanabe et al. | |
| 2008/0318161 A1 | 12/2008 | Nakano et al. | |
| 2011/0046307 A1* | 2/2011 | Takeshi et al. .................. | 525/89 |

FOREIGN PATENT DOCUMENTS

| | | |
|---|---|---|
| EP | 1 775 332 A1 | 4/2007 |
| EP | 1625178 B1 | 7/2007 |
| GB | 1395822 A | 5/1975 |
| JP | 51-125135 A | 11/1976 |
| JP | 56-59230 A | 5/1981 |
| JP | 57-178722 A | 11/1982 |
| JP | 59-187048 A | 10/1984 |
| JP | 61-231070 A | 10/1986 |
| JP | 63-66277 A | 3/1988 |
| JP | 63-179956 A | 7/1988 |
| JP | 64-65152 A | 3/1989 |
| JP | 64-79251 A | 3/1989 |
| JP | 2-222440 A | 9/1990 |
| JP | 5-93176 A | 4/1993 |
| JP | 5-263056 A | 10/1993 |
| JP | 5-287084 A | 11/1993 |
| JP | 8-60121 A | 3/1996 |
| JP | 8-283685 A | 10/1996 |

(Continued)

OTHER PUBLICATIONS

International Search Report for PCT/JP2009/071692 dated Feb. 23, 2010.
Extended European Search Report for European Application No. 10746236.8, dated Jun. 22, 2012.

(Continued)

*Primary Examiner* — Jeffrey Mullis
(74) *Attorney, Agent, or Firm* — Birch, Stewart, Kolasch & Birch, LLP

(57) ABSTRACT

An object of the present invention is to provide a block copolymer composition containing an aromatic vinyl-conjugated diene-aromatic vinyl block copolymer, which is capable of achieving a high-level balance between a high elastic modulus and a small permanent set, and is capable of producing a highly isotropic molded product having uniform mechanical properties even when a molding method which is likely to cause molecular orientation, such as extrusion molding, is applied. The object is attained by providing a block copolymer composition comprising a block copolymer A represented by the following Formula (A) and a block copolymer B represented by the following Formula (B), wherein a weight ratio (A/B) between the block copolymer A and the block copolymer B is 36/64 to 85/15:

$$Ar1^a - D^a - Ar2^a \quad (A)$$

$$(Ar^b - D^b)_n - X \quad (B),$$

in the Formulae (A) and (B), $Ar1^a$ and $Ar^b$ each represent an aromatic vinyl polymer block having a weight average molecular weight of 6,000 to 15,000; $Ar2^a$ represents an aromatic vinyl polymer block having a weight average molecular weight of 40,000 to 400,000; W and $D^b$ each represent a conjugated diene polymer block having a vinyl bond content of 1 mol % to 20 mol %; X represents a residue of a coupling agent; and n represents an integer of 3 or greater.

9 Claims, No Drawings

(56) References Cited

FOREIGN PATENT DOCUMENTS

| | | |
|---|---|---|
| JP | 9-66554 A | 3/1997 |
| JP | 9-78048 A | 3/1997 |
| JP | 11-12430 A | 1/1999 |
| JP | 2000-155418 A | 6/2000 |
| JP | 2000-204129 A | 7/2000 |
| JP | 2001-504519 A | 4/2001 |
| JP | 2001-520244 A | 10/2001 |
| JP | 2002-60583 A | 2/2002 |
| JP | 2002-72457 A | 3/2002 |
| JP | 2002-519465 A | 7/2002 |
| JP | 2003-73434 A | 3/2003 |
| JP | 2003-261740 A | 9/2003 |
| JP | 2004-107519 A | 4/2004 |
| JP | 2004-238548 A | 8/2004 |
| JP | 2004-331707 A | 11/2004 |
| JP | 2005-510612 A | 4/2005 |
| JP | 2005-232246 A | 9/2005 |
| JP | 2006-89546 A | 4/2006 |
| JP | 2006-514338 A | 4/2006 |
| JP | 2006-241177 A | 9/2006 |
| JP | 2006-520826 A | 9/2006 |
| JP | 2006-274158 A | 10/2006 |
| JP | 2006-282683 A | 10/2006 |
| JP | 2006-528273 A | 12/2006 |
| JP | 2007-230180 A | 9/2007 |
| JP | 2008-7654 A | 1/2008 |
| JP | 2008-533230 A | 8/2008 |
| WO | WO 97/30844 A1 | 8/1997 |
| WO | WO 99/19388 A1 | 4/1999 |
| WO | WO 00/00546 A1 | 1/2000 |
| WO | WO 03/020825 A1 | 3/2003 |
| WO | WO 2004/076556 A1 | 9/2004 |
| WO | WO 2004/104095 A1 | 12/2004 |
| WO | WO 2005/031459 A1 | 4/2005 |
| WO | WO 2006/051863 A1 | 5/2006 |
| WO | WO 2007/072613 A1 | 6/2007 |
| WO | WO 2009/123089 A1 | 10/2009 |
| WO | WO 2009123089 * | 10/2009 |

OTHER PUBLICATIONS

International Search Report for International Application No. PCT/JP2009/056449, dated Jun. 9, 2009.
International Search Search Report for International Application No. PCT/JP2009/071684, dated Feb. 2, 2010.
International Search Report for International Application No. PCT/JP2010/052879, dated Mar. 23, 2010.
International Search Report for International Application No. PCT/JP2010/055580, dated Jun. 15, 2010.
International Search Report for International Application No. PCT/JP2010/055581, dated Jun. 29, 2010.
International Search Report for International Application No. PCT/JP2010/060760, dated Aug. 10, 2010.
US Office Action for U.S. Appl. No. 12/935,361, dated Aug. 31, 2012.
US Office Action for U.S. Appl. No. 13/142,065, dated Sep. 7, 2012.
US Office Action for U.S. Appl. No. 13/255,354, dated Aug. 31, 2012.
US Office Action for U.S. Appl. No. 13/138,493, dated Feb. 19, 2013.
Notice of Allowance for U.S. Appl. No. 13/255,354, dated Mar. 18, 2013.
Notice of Allowance for copending U.S. Appl. No. 13/142,065, dated Apr. 5, 2013.
European Search Report Issued in European Application No. 10758654.7 on Jun. 5, 2013.

* cited by examiner ns, is applied.

BLOCK COPOLYMER COMPOSITION, FILM, AND METHOD FOR PRODUCING BLOCK COPOLYMER COMPOSITION

TECHNICAL FIELD

The present invention relates to a block copolymer composition containing an aromatic vinyl-conjugated diene-aromatic vinyl block copolymer, and a method for producing the block copolymer composition. More particularly, the present invention relates to a block copolymer composition which can be suitably used as a material for forming an elastic film or the like that is suitably used as a member of hygiene products such as disposable diapers or sanitary products, and which has both a high elastic modulus and a small permanent set, and a method for producing a block copolymer composition suitable for obtaining the block copolymer composition.

BACKGROUND ART

Aromatic vinyl-conjugated diene-aromatic vinyl block copolymers such as a styrene-isoprene-styrene block copolymer (SIS) and a styrene-butadiene-styrene block copolymer (SBS) are thermoplastic elastomers having characteristic properties in various aspects, and are therefore used in a variety of applications. Among thermoplastic elastomers, since aromatic vinyl-conjugated diene-aromatic vinyl block copolymers in particular are highly elastic and flexible, use of the copolymers as a material for elastic films used in hygiene products such as disposable diapers and sanitary products, has become one of representative applications of aromatic vinyl-conjugated diene-aromatic vinyl block copolymers.

Since hygiene products such as disposable diapers and sanitary products are required to have following capability and to fit to the movement of wearers, elastic films are used in various parts of those products. For example, in pull-up diapers which are a type of disposable diapers, elastic films are disposed in the opening areas around the legs, the opening area around the waist, and both hip areas. Since it is necessary that hygiene products do not move out of place even if the wearers move very actively or if the hygiene products are worn for a long time period, elastic films that are used in such applications are required to have both a high elastic modulus and a small permanent set. However, regarding the conventional aromatic vinyl-conjugated diene-aromatic vinyl block copolymers, it has been inappropriate to say that a good balance is achieved between these characteristics. Therefore, investigations have been extensively carried out to improve the elastic modulus or the permanent set of aromatic vinyl-conjugated diene-aromatic vinyl block copolymers.

For example, Patent Literature 1 discloses that when an elastomeric polymer blend composition containing 65 to 92 parts by weight of a specific elastomer-monovinylidene aromatic-conjugated diene block copolymer having a monovinylidene aromatic content of less than 50% by weight, and 8 to 35 parts by weight of a specific thermoplastic monovinylidene aromatic-conjugated diene block copolymer having a monovinylidene aromatic content of 50% by weight or more is used, elastomer articles exhibiting excellent elasticity and stress relaxation characteristics are obtained.

Furthermore, Patent Literature 2 discloses that when a composition obtainable by incorporating a specific polyisoprene or the like into a specific aromatic vinyl-conjugated diene block copolymer is extrusion molded, an elastic film which is anisotropic and excellent in flexibility, and which is suitably used as a member of hygiene products such as disposable diapers and sanitary products, is obtained.

However, even the technologies described in these documents are still unsatisfactory from the viewpoint of achieving a high-level balance between a high elastic modulus and a small permanent set, and further improvements have been desired.

Forming of an elastic film is usually carried out by extrusion molding, but when a conventional aromatic vinyl-conjugated diene-aromatic vinyl block copolymer is made into a film by extrusion molding, there is a problem that anisotropy in the mechanical properties due to molecular orientation is likely to occur. Materials that are likely to cause such anisotropy are generally poor in molding stability, and have a problem that in the case of forming a film, the thickness accuracy is deteriorated. Furthermore, for example, when an elastic film is used in hygiene products such as disposable diapers and sanitary products, if the elastic film is anisotropic, the feeling of wear of the hygiene products is different from that of ordinary underclothes and the like, and there is a problem that the hygiene products cause a sense of discomfort to the wearers.

CITATION LIST

Patent Literature

Patent Literature 1: Japanese Patent Application National Publication No. 2006-528273
Patent Literature 2: Japanese Patent Application Laid-Open No. 2008-007654

SUMMARY OF INVENTION

Technical Problem

An object of the present invention is to provide a block copolymer composition containing an aromatic vinyl-conjugated diene-aromatic vinyl block copolymer, which is capable of achieving a high-level balance between a high elastic modulus and a small permanent set, and is capable of producing a highly isotropic molded product having uniform mechanical properties even when a molding method which is likely to cause molecular orientation, such as extrusion molding, is applied.

Solution to Problem

The inventors of the present invention conducted a thorough investigation to achieve the object described above, and as a result, they found that when a block copolymer composition obtained by mixing an asymmetric aromatic vinyl-conjugated diene-aromatic vinyl block copolymer in which two aromatic vinyl polymer blocks have specific weight average molecular weights that are different from each other, with a branched aromatic vinyl-conjugated diene-aromatic vinyl block copolymer having a particular constitution, at a particular proportion is used, a balance between a high elastic modulus and a small permanent set is achieved at a high level. Furthermore, the inventors also found that when a film is formed using this block copolymer composition, the film acquires a high elastic modulus and a small permanent set that are balanced at a high level, and the elastic modulus does not easily vary even when the film is repeatedly elongated and contracted. Also, the inventors found that even in the case where a molding method that is likely to cause molecular orientation, such as extrusion molding, is applied, the film has uniform mechanical properties in all plane directions, and is highly isotropic. In addition, the inventors of the present invention also conducted investigations on the method for producing this block copolymer composition, and they found that when a method of producing an aromatic vinyl-conjugated diene block copolymer having an active terminal, subsequently coupling a portion of the copolymer with a tri- or higher-functional coupling agent, and forming an aromatic vinyl polymer block at the active terminal of the remaining portion of the copolymer, is used, a block copolymer composition having a particularly favorable constitution is obtained with high productivity. The present invention was finally completed based on these findings.

Thus, the present invention provides a block copolymer composition comprising a block copolymer A represented by the following Formula (A) and a block copolymer B represented by the following Formula (B), wherein a weight ratio (A/B) between the block copolymer A and the block copolymer B is 36/64 to 85/15:

$$Ar1^a-D^a-Ar2^a \qquad (A)$$

$$(Ar^b-D^b)_n-X \qquad (B),$$

in the Formulae (A) and (B), $Ar1^a$ and $Ar^b$ each represent an aromatic vinyl polymer block having a weight average molecular weight of 6,000 to 15,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a residue of a coupling agent; and n represents an integer of 3 or greater.

In the block copolymer composition, a content of an aromatic vinyl monomer unit relative to all repeating units of polymer components in the block copolymer composition is preferably 27% to 70% by weight.

In addition, according to the present invention, a film formed by molding the block copolymer composition is provided.

Furthermore, according to the present invention, a method for producing the block copolymer composition comprising the following Processes of (1) to (5) is provided:

(1): polymerizing an aromatic vinyl monomer by using a polymerization initiator in a solvent;

(2): adding a conjugated diene monomer to a solution containing an aromatic vinyl polymer having an active terminal, which is obtained in the Process (1);

(3): adding a tri-or higher-functional coupling agent to a solution containing an aromatic vinyl-conjugated diene block copolymer having an active terminal, which is obtained in the Process (2), by an amount such that an amount of functional groups of the coupling agent relative to the active terminal is less than 1 molar equivalent, and thereby forming the block copolymer B;

(4): adding an aromatic vinyl monomer to a solution that is obtained in the Process (3), and thereby forming the block copolymer A; and (5): collecting the block copolymer composition from a solution that is obtained in the Process (4).

The inventors of the present invention also found that when a block copolymer composition containing an asymmetric aromatic vinyl-conjugated diene-aromatic vinyl block copolymer in which two aromatic vinyl polymer blocks have specific weight average molecular weights that are different from each other, a linear aromatic vinyl-conjugated diene-aromatic vinyl block copolymer having a particular constitution different from that of the foregoing block copolymer, and a branched aromatic vinyl-conjugated diene-aromatic vinyl block copolymer having a particular constitution, is used, a balance between a high elastic modulus and a small permanent set is achieved at a high level. Furthermore, the inventors also found that when a film is formed using this block copolymer composition, the film acquires a high elastic modulus and a small permanent set that are balanced at a high level, and the elastic modulus does not easily vary even when the film is repeatedly elongated and contracted. Also, the inventors found that even in the case where a molding method that is likely to cause molecular orientation, such as extrusion molding, is applied, the film has uniform mechanical properties in all plane directions, and is highly isotropic. In addition, the inventors of the present invention also conducted investigations on the method for producing this block copolymer composition, and they found that when a method of producing an aromatic vinyl-conjugated diene block copolymer having an active terminal, subsequently coupling a portion of the copolymer with a combination of a bifunctional coupling agent and a tri- or higher-functional coupling agent, and forming an aromatic vinyl polymer block at the active terminal of the remaining portion of the copolymer, is used, a block copolymer composition having a particularly favorable constitution is obtained with high productivity. The present invention was finally completed based on these findings.

Thus, the present invention provides a block copolymer composition comprising a block copolymer P represented by the following Formula (P), a block copolymer Q represented by the following Formula (Q), and a block copolymer R represented by the following Formula (R):

$$Ar1^p-D^p-Ar2^p \qquad (P)$$

$$(Ar^q-D^q)_2-X^q \qquad (Q)$$

$$(Ar^r-D^r)_m-X^r \qquad (R),$$

in the Formulae (P), (Q) and (R), $Ar1^p$, $Ar^q$ and $Ar^r$ each represent an aromatic vinyl polymer block having a weight average molecular weight of 6,000 to 20,000; $Ar2^p$ represents an aromatic vinyl polymer block having a weight average molecular weight of 40,000 to 400,000; $D^p$, $D^q$ and $D^r$ each represent a conjugated diene polymer block having a vinyl bond content of 1 mol % to 20 mol %; $X^q$ represents a single bond, or a residue of a coupling agent; $X^r$ represents a residue of a coupling agent; and m represents an integer of 3 or greater.

According to the present invention, there is obtained a block copolymer composition containing an aromatic vinyl-conjugated diene-aromatic vinyl block copolymer, which has a balance between a high elastic modulus and a small permanent set achieved at a high level. Also, according to the present invention, there is obtained a highly isotropic film which has a high elastic modulus and a small permanent set, has an elastic modulus that does not easily vary even if the film is repeatedly elongated and contracted, and has uniform mechanical properties in all plane directions of the film even when a molding method which is likely to cause molecular orientation, such as extrusion molding, is applied.

In the block copolymer composition, a weight ratio (P/(Q+R)) between an amount of the block copolymer P, and a total amount of the block copolymer Q and the block copolymer R is preferably 10/90 to 80/20.

In the block copolymer composition, a weight ratio (Q/R) between an amount of the block copolymer Q and an amount of the block copolymer R is preferably 15/85 to 85/15.

In the block copolymer composition, a content of an aromatic vinyl monomer unit relative to all repeating units of polymer components in the block copolymer composition is preferably 27% to 70% by weight.

In addition, according to the present invention, a film formed by molding the block copolymer composition is provided.

Furthermore, according to the present invention, a method for producing the block copolymer composition comprising the following Processes of (6) to (10) is provided:

(6): polymerizing an aromatic vinyl monomer by using a polymerization initiator in a solvent;

(7): adding a conjugated diene monomer to a solution containing an aromatic vinyl polymer having an active terminal, which is obtained in the Process (6);

(8): adding a bifunctional coupling agent and a tri- or higher-functional coupling agent to a solution containing an aromatic vinyl-conjugated diene block copolymer having an active terminal, which is obtained in the Process (7), by an amount such that a total amount of functional groups relative to the active terminal is less than 1 molar equivalent, and thereby forming the block copolymer Q and the block copolymer R;

(9): adding an aromatic vinyl monomer to a solution that is obtained in the Process (8), and thereby forming the block copolymer P; and (10): collecting the block copolymer composition from a solution that is obtained in the Process (9).

According to the production method of the present invention, the block copolymer composition of the present invention is obtained with high productivity.

Advantageous Effects of Invention

According to the present invention, there is obtained a block copolymer composition containing an aromatic vinyl-conjugated diene-aromatic vinyl block copolymer, which has a balance between a high elastic modulus and a small permanent set achieved at a high level. Also, according to the present invention, there is obtained a highly isotropic film which has a high elastic modulus and a small permanent set, has an elastic modulus that does not easily vary even if the film is repeatedly elongated and contracted, and has uniform mechanical properties in all plane directions of the film even when a molding method which is likely to cause molecular orientation, such as extrusion molding, is applied. Furthermore, according to the production method of the present invention, the block copolymer composition of the present invention is obtained with high productivity.

DESCRIPTION OF EMBODIMENTS

The block copolymer composition of the present invention can be described with two embodiments, including an embodiment containing two kinds of block copolymers (first embodiment) and an embodiment containing at least three kinds of block copolymers (second embodiment). Hereinafter, the block copolymer composition of the present invention will be described in accordance with the respective embodiments.

1. First Embodiment

First, the first embodiment of the block copolymer composition of the present invention will be described. The block copolymer composition according to the present embodiment contains two kinds of block copolymers. A block copolymer A, which is one of the two kinds of block copolymers constituting the block copolymer composition of the present embodiment, is a linear aromatic vinyl-conjugated diene-aromatic vinyl block copolymer represented by the following Formula (A), which has two aromatic vinyl polymer blocks having weight average molecular weights that are different from each other.

$$Ar1^a-D^a-Ar2^a \tag{A}$$

In the Formula (A), $Ar1^a$ represents an aromatic vinyl polymer block having a weight average molecular weight of 6,000 to 15,000; $Ar2^a$ represents an aromatic vinyl polymer block having a weight average molecular weight of 40,000 to 400,000; and $D^a$ represents a conjugated diene polymer block having a vinyl bond content of 1 mol % to 20 mol %.

Furthermore, a block copolymer B, which is one of the two kinds of block copolymers constituting the block copolymer composition of the present embodiment, is a branched block copolymer represented by the following Formula (B).

$$(Ar^b-D^b)_n-X \tag{B}$$

In the Formula (B), each of $Ar^b$ represents an aromatic vinyl polymer block having a weight average molecular weight of 6,000 to 15,000; each of $D^b$ represents a conjugated diene polymer block having a vinyl bond content of 1 mol % to 20 mol %; X represents a residue of a coupling agent; and n represents an integer of 3 or greater.

The aromatic vinyl polymer blocks ($Ar1^a$, $Ar2^a$ and $Ar^b$) of the block copolymer A and the block copolymer B are polymer blocks each constituted of an aromatic vinyl monomer unit. There are no particular limitations on the aromatic vinyl monomer that may be used to constitute the aromatic vinyl monomer units of the aromatic vinyl polymer blocks as long as the aromatic vinyl monomer is an aromatic vinyl compound, but examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene. Among these, it is preferable to use styrene. These aromatic vinyl monomers can be used singly or in combination of two or more kinds, in the respective aromatic vinyl polymer blocks. Furthermore, for the respective aromatic vinyl polymer blocks, an identical aromatic vinyl monomer may be used, or different aromatic vinyl monomers may be used.

The aromatic vinyl polymer blocks ($Ar1^a$, $Ar2^a$ and $Ar^b$) of the block copolymer A and the block copolymer B may respectively include a monomer unit other than the aromatic vinyl monomer unit. Examples of monomers that constitute the monomer unit other than the aromatic vinyl monomer unit, which can be included in the aromatic vinyl polymer blocks, include a conjugated diene monomer such as 1,3-butadiene or isoprene (2-methyl-1,3-butadiene), an α,β-unsaturated nitrile monomer, an unsaturated carboxylic acid or acid anhydride monomer, an unsaturated carboxylic acid ester monomer, and a non-conjugated diene monomer. The content of the monomer unit other than the aromatic vinyl monomer unit in the respective aromatic vinyl polymer blocks is preferably 20% by weight or less, and more preferably 10% by weight or less, and it is particularly preferable that the content be substantially 0% by weight.

The conjugated diene polymer blocks ($D^a$ and $D^b$) of the block copolymer A and the block copolymer B are polymer blocks each constituted of a conjugated diene monomer unit. There are no particular limitations on the conjugated diene monomer that may be used to constitute the conjugated diene monomer units of the conjugated diene polymer blocks as long as the conjugated diene monomer is a conjugated diene compound, but examples include 1,3-butadiene, isoprene, 2,3-dimethyl-1,3-butadiene, 2-chloro-1,3-butadiene, 1,3-pentadiene, and 1,3-hexadiene. Among these, it is preferable to use 1,3-butadiene and/or isoprene, and it is particularly preferable to use isoprene. When the conjugated diene polymer blocks are constituted of an isoprene unit, a block copolymer composition having excellent flexibility and a lower permanent set can be obtained. These conjugated diene monomers can be used singly or in combination of two or more kinds, in the respective conjugated diene polymer blocks. Furthermore, for the respective conjugated diene polymer blocks, an identical conjugated diene monomer may be used, or different conjugated diene monomers may be used. In addition, the unsaturated bonds in the respective conjugated diene polymer blocks may also be partially subjected to a hydrogenation reaction.

The conjugated diene polymer blocks ($D^a$ and $D^b$) of the block copolymer A and the block copolymer B may respectively include a monomer unit other than the conjugated diene monomer unit. Examples of monomers that constitute the monomer unit other than the conjugated diene monomer unit, which can be included in the conjugated diene polymer blocks, include an aromatic vinyl monomer such as styrene or α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the respective conjugated diene polymer blocks is preferably 20% by weight or less, and more preferably 10% by weight or less, and it is particularly preferable that the content be substantially 0% by weight.

The block copolymer A constituting the block copolymer composition of the present embodiment is an asymmetric aromatic vinyl-conjugated diene-aromatic vinyl block copolymer composed of an aromatic vinyl polymer block ($Ar1^a$) having a relatively small weight average molecular weight, a conjugated diene polymer block ($D^a$) having a specific vinyl bond content, and an aromatic vinyl polymer block ($Ar2^a$) having a relatively large weight average molecular weight, linked in this order in a linear form, as represented by the Formula (A). The weight average molecular weight ($Mw(Ar1^a)$) of the aromatic vinyl polymer block ($Ar1^a$) having a relatively small weight average molecular weight is 6,000 to 15,000, preferably 7,000 to 14,000, and more preferably 8,000 to 13,000. If the value of $Mw(Ar1^a)$ does not fall in this range, there is a risk that the resulting composition may have an insufficient permanent set. Furthermore, the weight average molecular weight ($Mw(Ar1^a)$) of the aromatic vinyl polymer block ($Ar2^a$) having a relatively large weight average molecular weight is 40,000 to 400,000, preferably 42,000 to 370,000, and more preferably 45,000 to 350,000. If the value of $Mw(Ar2^a)$ is too small, there is a risk that the resulting composition may have an insufficient permanent set. On the other hand, a block copolymer A having an excessively large value of $Mw(Ar2^a)$ may be difficult to produce.

In the present embodiment, the weight average molecular weight of a polymer or a polymer block is a value determined by an analysis by high performance liquid chromatography, relative to polystyrene standards.

In the block copolymer A, there are no particular limitations on the ratio ($Mw(Ar2^a)/Mw(Ar1^a)$) of the weight average molecular weight ($Mw(Ar2^a)$) of the aromatic vinyl polymer block ($Ar2^a$) having a relatively large weight average molecular weight and the weight average molecular weight ($Mw(Ar1^a)$) of the aromatic vinyl polymer block ($Ar1^a$) having a relatively small weight average molecular weight, but the ratio is usually 2.6 to 67, preferably 4 to 40, and more preferably 4.5 to 35. When the block copolymer A is constructed as such, a block copolymer composition which has a lower permanent set and a higher elastic modulus and is highly elastic, can be obtained.

The vinyl bond content of the conjugated diene polymer block ($D^a$) of the block copolymer A (the content of 1,2-vinyl bonds and 3,4-vinyl bonds in all the conjugated diene monomer units) is 1 mol % to 20 mol %, preferably 2 mol % to 15 mol %, and more preferably 3 mol % to 10 mol %. If this vinyl bond content is too large, there is a risk that the resulting block copolymer composition may have a larger permanent set.

The weight average molecular weight ($Mw(D^a)$) of the conjugated diene polymer block ($D^a$) of the block copolymer A is not particularly limited, but is usually 20,000 to 200,000, preferably 30,000 to 150,000, and more preferably 35,000 to 100,000.

There are no particular limitations on the content of the aromatic vinyl monomer units relative to the total amount of the monomer units of the block copolymer A, but the content is usually 40% to 90% by weight, preferably 45 to 87% by weight, and more preferably 50 to 85% by weight. Furthermore, there are no particular limitations on the overall weight average molecular weight of the block copolymer A, but the weight average molecular weight is usually 50,000 to 500,000, preferably 80,000 to 470,000, and more preferably 90,000 to 450,000.

The block copolymer B constituting the block copolymer composition of the present embodiment is a branched block copolymer in which three or more of diblock forms ($Ar^b$–$D^b$), each of which is composed of an aromatic vinyl polymer block ($Ar^b$) having a specific weight average molecular weight linked to a conjugated diene polymer block ($D^b$) having a specific vinyl bond content, are linked via a coupling agent residue (X) such that the aromatic vinyl polymer block ($Ar^b$) side comes as the terminal, as represented by the Formula (B). The weight average molecular weights ($Mw(Ar^b)$) of the plural aromatic vinyl polymer blocks ($Ar^b$) included in the block copolymer B are each 6,000 to 15,000, preferably 7,000 to 14,000, and more preferably 8,000 to 13,000. If the value of $Mw(Ar^b)$ does not fall in this range, there is a risk that the resulting composition may have an insufficient permanent set. If the weight average molecular weights ($Mw(Ar2^b)$) of the aromatic vinyl polymer blocks which are present in a plural number in one molecule are in the range described above, the weight average molecular weights may be identical with or different from one another; however, it is preferable that the weight average molecular weights be substantially identical. Furthermore, it is more preferable that the weight average molecular weights ($Mw(Ar^b)$) of these plural aromatic vinyl polymer blocks be substantially identical with the weight average molecular weight ($Mw(Ar1^a)$) of the aromatic vinyl polymer block ($Ar1^a$) having a relatively small weight average molecular weight in the block copolymer A.

The vinyl bond content of the conjugated diene polymer block ($D^b$) of the block copolymer B is 1 mol % to 20 mol %, preferably 2 mol % to 15 mol %, and more preferably 3 mol % to 10 mol %. If this vinyl bond content is too large, there is a risk that the resulting block copolymer composition may have a larger permanent set. Furthermore, it is preferable that the vinyl bond content of the conjugated diene polymer block ($D^b$) of the block copolymer B be substantially identical with the vinyl bond content of the conjugated diene polymer block ($D^a$) of the block copolymer A.

There are no particular limitations on the weight average molecular weight ($Mw(D^b)$) of the conjugated diene polymer block ($D^b$) of the block copolymer B, but the weight average molecular weight is usually 20,000 to 200,000, preferably 30,000 to 150,000, and more preferably 35,000 to 100,000. It is preferable that the weight average molecular weight (Mw($D^b$)) of the conjugated diene polymer block ($D^b$) of the block copolymer B be substantially identical with the weight average molecular weight (Mw($D^a$)) of the conjugated diene polymer block ($D^a$) of the block copolymer A. When these weight average molecular weights are substantially identical, the resulting block copolymer composition acquires a higher elastic modulus and becomes highly elastic.

There are no particular limitations on the content of the aromatic vinyl monomer unit relative to the total amount of the monomer units of the block copolymer B, but the content is usually 10% to 35% by weight, preferably 12% to 32% by weight, and more preferably 15% to 30% by weight. Also, there are no particular limitations on the overall weight average molecular weight of the block copolymer B, but the overall weight average molecular weight is usually 35,000 to 450,000, preferably 50,000 to 400,000, and more preferably 70,000 to 350,000.

There are no particular limitations on the molecular weight distribution, which is expressed as the ratio (Mw/Mn) of the weight average molecular weight (Mw) and the number average molecular weight (Mn), of the block copolymer A and the block copolymer B constituting the block copolymer composition of the present embodiment, and of each of the polymer blocks constituting these block copolymers, but the molecular weight distribution is usually 1.1 or less, and preferably 1.05 or less.

The weight ratio (A/B) of the block copolymer A and the block copolymer B contained in the block copolymer composition of the present embodiment is 36/64 to 85/15, preferably 38/62 to 80/20, and more preferably 40/60 to 75/25. When the respective block copolymers are included at these ratios, the block copolymer composition has both a high elastic modulus and a small permanent set. If this ratio is too small, the block copolymer composition has an insufficient elastic modulus, and if this ratio is too large, the block copolymer composition has a large permanent set.

It is desirable that the block copolymer composition of the present embodiment contains the block copolymer A and the block copolymer B only as polymer components, but it is also acceptable that the block copolymer composition contains a polymer component other than the block copolymer A and the block copolymer B. Examples of the polymer component other than the block copolymer A and the block copolymer B, which can be included in the block copolymer composition of the present embodiment, include an aromatic vinyl-conjugated diene-aromatic vinyl block copolymer other than the block copolymer A and the block copolymer B, an aromatic vinyl-conjugated diene block copolymer, an aromatic vinyl homopolymer, a conjugated diene homopolymer, an aromatic vinyl-conjugated diene random copolymer, and branched polymers thereof; as well as thermoplastic elastomers such as a polyurethane-based thermoplastic elastomer, a polyamide-based thermoplastic elastomer, and a polyester-based thermoplastic elastomer; and thermoplastic resins such as polyethylene, polypropylene, polyvinyl chloride, an acrylonitrile-styrene copolymer, an acrylonitrile-butadiene-styrene copolymer, and polyphenylene ether. In the block copolymer composition of the present embodiment, the content of the polymer component other than the block copolymer A and the block copolymer B is preferably 20% by weight or less, and more preferably 10% by weight or less, relative to the total amount of the polymer components.

In the block copolymer composition of the present embodiment, the content of the aromatic vinyl monomer units (in the following descriptions, may be referred to as a total aromatic vinyl monomer unit content) relative to all repeating units of the entire polymer components included in the composition is 27% to 70% by weight, preferably 30% to 60% by weight, and more preferably 40% to 50% by weight. If the total aromatic vinyl monomer unit content is too small, the resulting block copolymer composition has an insufficient elastic modulus, and if the total aromatic vinyl monomer unit content is too large, the resulting block copolymer composition has a large permanent set. This total aromatic vinyl monomer unit content can be easily regulated by taking the contents of the block copolymer A, the block copolymer B and a polymer component other than these, which constitute the block copolymer composition, and the contents of the respective aromatic vinyl monomer units into consideration, and regulating their amounts of incorporation. In addition, in case where all the polymer components that constitute the block copolymer composition are composed of aromatic vinyl monomer units and conjugated diene monomer units only, when the polymer components of the block copolymer composition are subjected to ozone decomposition and then to reduction with lithium aluminum hydride according to the method described in Rubber Chem. Technol., 45, 1295 (1972), the conjugated diene monomer unit portion is decomposed, and only the aromatic vinyl monomer unit portion can be extracted. Therefore, the total aromatic vinyl monomer unit content can be easily measured.

There are no particular limitations on the overall weight average molecular weight of the polymer components constituting the block copolymer composition of the present embodiment, but the overall weight average molecular weight is usually 50,000 to 500,000, preferably 60,000 to 450,000, and more preferably 70,000 to 400,000. Furthermore, there are no particular limitations on the molecular weight distribution, which is expressed as the ratio (Mw/Mn) of the weight average molecular weight (Mw) and the number average molecular weight (Mn) of the entire polymer components constituting the block copolymer composition of the present embodiment, but the molecular weight distribution is usually 1.01 to 10, preferably 1.03 to 5, and more preferably 1.05 to 3.

There are no particular limitations on the melt index of the block copolymer composition of the present embodiment, but as a value measured according to ASTM D-1238 (G conditions, 200° C., 5 kg), the melt index is usually 1 to 70 g/10 min, preferably 3 to 65 g/10 min, and more preferably 5 to 60 g/10 min. When the melt index is in this range, the block copolymer composition acquires satisfactory moldability into films or the like.

The block copolymer composition of the present embodiment may contain components other than the polymer components, and for example, additives such as a softening agent, a tackifier, an antioxidant, an antibacterial agent, a light stabilizer, an ultraviolet absorber, a dye, a lubricant, a crosslinking agent, and a crosslinking promoting agent may be incorporated as necessary.

There are no particular limitations on the method of obtaining the block copolymer composition of the present embodiment. For example, the block copolymer composition can be produced by separately producing a block copolymer A and a block copolymer B according to a conventional method for producing a block copolymer, incorporating other polymer components or various additives according to necessity, and then mixing the components according to a conventional method such as kneading or solution mixing. However, from the viewpoint of obtaining the block copolymer composition of the present embodiment having a particularly preferred constitution with higher productivity, the method for producing the block copolymer composition of the present embodiment that will be described below is suitable.

The method for producing the block copolymer composition of the present embodiment comprises the following Processes of (1) to (5).

(1): Process of polymerizing an aromatic vinyl monomer using a polymerization initiator in a solvent.

(2): Process of adding a conjugated diene monomer to a solution containing an aromatic vinyl polymer having an active terminal, which is obtained in the Process (1).

(3): Process of adding a tri-or higher-functional coupling agent to a solution containing an aromatic vinyl-conjugated diene block copolymer having an active terminal, which is obtained in the Process (2), by an amount such that an amount of the functional groups of the coupling agent relative to the active terminal is less than 1 molar equivalent, and thereby forming the block copolymer B.

(4): Process of adding an aromatic vinyl monomer to a solution that is obtained in the Process (3), and thereby forming the block copolymer A.

(5): Process of collecting the block copolymer composition from a solution that is obtained in the Process (4).

In the method for producing the block copolymer composition of the present embodiment, first, an aromatic vinyl monomer is polymerized by using a polymerization initiator in a solvent. Examples of the polymerization initiator that can be used include an organic alkali metal compound, an organic alkaline earth metal compound, and an organic lanthanoid series rare earth metal compound, which are generally known to have an anionic polymerization activity toward aromatic vinyl monomers and conjugated diene monomers. As the organic alkali metal compound, an organolithium compound having one or more lithium atoms in the molecule is particularly suitably used, and specific examples thereof include organic monolithium compounds such as ethyllithium, n-propyllithium, isopropyllithium, n-butyllithium, sec-butyllithium, t-butyllithium, hexyllithium, phenyllithium, stilbene lithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithioethylcyclohexane; and organic trilithium compounds such as 1,3,5-trilithiobenzene. Among these, organic monolithium compounds are particularly suitably used.

Examples of the organic alkaline earth metal compound that is used as a polymerization initiator include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators include compounds which form a homogeneous system in an organic solvent and have living polymerizability, such as a composite catalyst formed from a lanthanoid series rare earth metal compound containing neodymium, samarium, gadolinium or the like/alkylaluminum/alkylaluminum halide/alkylaluminum hydride, and a metallocene type catalyst containing titanium, vanadium, samarium, gadolinium or the like. These polymerization initiators may be used singly, or as mixtures of two or more kinds.

The amount of use of the polymerization initiator may be determined in accordance with the intended molecular weight of each block copolymer and is not particularly limited. However, the amount of use is usually 0.01 to 20 millimoles, preferably 0.05 to 15 millimoles, and more preferably 0.1 to 10 millimoles, per 100 g of the total amount of monomers used.

There are no particular limitations on the solvent used in the polymerization as long as the solvent is inert to the polymerization initiator, and for example, a linear hydrocarbon solvent, a cyclic hydrocarbon solvent, or a solvent mixture thereof is used. Examples of the linear hydrocarbon solvent include linear alkanes and alkenes having 4 to 6 carbon atoms, such as n-butane, isobutene, 1-butene, isobutylene, trans-2-butene, cis-2-butene, 1-pentene, trans-2-pentene, cis-2-pentene, n-pentane, isopentane, neo-pentane, and n-hexane. Specific examples of the cyclic hydrocarbon solvent include aromatic compounds such as benzene, toluene and xylene; and alicyclic hydrocarbon compounds such as cyclopentane and cyclohexane. These solvents may be used singly, or as mixtures of two or more kinds.

There are no particular limitations on the amount of the solvent used in the polymerization, but the amount is set such that the total concentration of the block copolymers in the solution after the polymerization reaction is usually 5% to 60% by weight, preferably 10% to 55% by weight, and more preferably 20% to 50% by weight.

Upon the preparation of the block copolymer composition, a Lewis base compound may be added to the reactor used in the polymerization, in order to control the structures of the various polymer blocks of the respective block copolymers. Examples of this Lewis base compound include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; and phosphines such as triphenylphosphine. These Lewis base compounds are used singly or in combination of two or more kinds, and are appropriately selected to the extent of not impairing the purposes of the present embodiment.

Furthermore, the timing for adding the Lewis base compound during the polymerization reaction is not particularly limited and may be appropriately determined in accordance with the structures of the respective intended block copolymers. For example, the Lewis base compound may be added in advance before initiation of the polymerization, or may be added after completion of the polymerization of a portion of the polymer blocks. It is also acceptable to add the Lewis base compound in advance before initiation of the polymerization and then to further add the Lewis base compound after completion of the polymerization of a portion of the polymer blocks.

The polymerization reaction temperature is usually 10° C. to 150° C., preferably 30° C. to 130° C., and more preferably 40° C. to 90° C. The time required for the polymerization may vary with the conditions, but the time is usually within 48 hours, and preferably 0.5 to 10 hours. The polymerization pressure may be set in a pressure range sufficient to maintain the monomers and the solvent in the liquid state in the polymerization temperature range, and there are no particular limitations on the pressure.

When an aromatic vinyl monomer is polymerized under the conditions such as described above using a polymerization initiator in a solvent, a solution containing an aromatic vinyl polymer having an active terminal can be obtained. This aromatic vinyl polymer having an active terminal will constitute the aromatic vinyl polymer block ($Ar1^a$) having a relatively small weight average molecular weight of the block copolymer A and the aromatic vinyl polymer block ($Ar^b$) of the block copolymer B, which are the constituents of the block copolymer composition. Therefore, the amount of the aromatic vinyl monomer used at this time is determined in accordance with the intended weight average molecular weight of these polymer blocks.

In the method for producing the block copolymer composition of the present embodiment, a conjugated diene monomer is added to the solution containing this aromatic vinyl polymer having an active terminal. The addition of this conjugated diene monomer leads to the formation of a conjugated diene polymer chain from the active terminal, and thus a solution containing an aromatic vinyl-conjugated diene block copolymer (diblock form) having an active terminal is obtained. The amount of the conjugated diene monomer used at this time is determined such that the conjugated diene polymer chain thus obtained has an intended weight average molecular weight of the conjugated diene polymer block ($D^b$) of the block copolymer B.

In the method for producing the block copolymer composition of the present embodiment, a tri- or higher-functional coupling agent is added to this solution containing an aromatic vinyl-conjugated diene block copolymer having an active terminal, by an amount such that the amount of the functional groups relative to the active terminal is less than 1 molar equivalent.

The coupling agent to be added is not particularly limited as long as it is a coupling agent having three or more functional groups that are capable of reacting with the active terminal of the polymer, in one molecule (that is, a tri- or higher-functional coupling agent), and any tri- or higher-functional coupling agent can be used. Examples of a trifunctional coupling agent include trifunctional halogenated alkanes such as trichloroethane and trichloropropane; trifunctional halogenated silanes such as methyltrichlorosilane and ethyltrichlorosilane; and trifunctional alkoxysilanes such as methyltrimethoxysilane, phenyltrimethoxysilane, and phenyltriethoxysilane. Examples of a tetrafunctional coupling agent include tetrafunctional halogenated alkanes such as carbon tetrachloride, carbon tetrabromide, and tetrachloroethane; tetrafunctional halogenated silanes such as tetrachloroethane and tetrabromosilane; tetrafunctional alkoxysilanes such as tetramethoxysilane and tetraethoxysilane; and tetrafunctional halogenated tin compounds such as tetrachlorotin and tetrabromotin. Examples of a penta- or higher-functional coupling agent include 1,1,1,2,2-pentachloroethane, perchloroethane, pentachlorobenzene, perchlorobenzene, octabromodiphenyl ether, and decabromodiphenyl ether. Among these, a tetrafunctional coupling agent is used with preference, and inter alia, a tetrafunctional halogenated silane or a tetrafunctional alkoxysilane is particularly preferably used.

These coupling agents may be used singly, or two or more kinds can be used in combination.

The amount of the tri- or higher-functional coupling agent to be added is determined in accordance with the ratio of the block copolymer A and the block copolymer B that constitute the block copolymer composition, and there are no particular limitations as long as the amount is such that the amount of the functional groups relative to the active terminal of the polymer is less than 1 molar equivalent. However, the amount of the tri- or higher-functional coupling agent is usually such that the amount of the functional groups of the coupling agent relative to the active terminal of the polymer is in the range of 0.15 to 0.90 molar equivalents, and preferably in the range of 0.20 to 0.70 molar equivalents.

As described above, when a tri- or higher-functional coupling agent is added to a solution containing an aromatic vinyl-conjugated diene block copolymer (diblock form) having an active terminal, by an amount such that the amount of the functional groups relative to the active terminal is less than 1 molar equivalent, in a portion of the aromatic vinyl-conjugated diene block copolymer (diblock form) having an active terminal, one conjugated diene polymer block is bonded to another conjugated diene polymer block via the residue of the coupling agent. As a result, the block copolymer B of the block copolymer composition is formed. The remaining portion of the aromatic vinyl-conjugated diene block copolymer (diblock form) having an active terminal remains unreacted in the solution.

Furthermore, in the method for producing the block copolymer composition of the present embodiment, a bifunctional coupling agent may be used in combination with the tri- or higher-functional coupling agent, to the extent that does not depart from the scope of the present embodiment. When a bifunctional coupling agent is used in combination, two pieces of the aromatic vinyl-conjugated diene block copolymer (diblock form) having an active terminal are bonded, and a linear aromatic vinyl-conjugated diene-aromatic vinyl block copolymer thus obtainable is present in the block copolymer composition. Examples of the bifunctional coupling agent include bifunctional halogenated silanes such as dichlorosilane, monomethyldichlorosilane, and dimethyldichlorosilane; bifunctional halogenated alkanes such as dichloroethane, dibromoethane, methylene chloride, and dibromomethane; and bifunctional halogenated tin compounds such as dichlorotin, monomethyldichlorotin, dimethyldichlorotin, monoethyldichlorotin, diethyldichlorotin, monobutyldichlorotin, and dibutyldichlorotin.

In the subsequent process, an aromatic vinyl monomer is added to the solution obtainable as described above. When an aromatic vinyl monomer is added to the solution, an aromatic vinyl polymer chain is formed from the terminal of the aromatic vinyl-conjugated diene block copolymer (diblock form) having an active terminal, which has remained without reacting with the coupling agent. This aromatic vinyl polymer chain constitutes the aromatic vinyl polymer block ($Ar2^a$) having a relatively large weight average molecular weight of the block copolymer A, which constitutes the block copolymer composition. Therefore, the amount of the aromatic vinyl monomer used at this time is determined in accordance with the intended weight average molecular weight of the aromatic vinyl polymer block ($Ar2^a$). Through this process of adding an aromatic vinyl monomer, an asymmetric aromatic vinyl-conjugated diene-aromatic vinyl block copolymer which constitutes the block copolymer A is formed, and as a result, a solution containing the block copolymer A and the block copolymer B is obtained. In addition, prior to this process of adding the aromatic vinyl monomer, a conjugated diene monomer may be added to the solution containing an aromatic vinyl-conjugated diene block copolymer (diblock form) having an active terminal which has not reacted with the coupling agent. When a conjugated diene monomer is added as such, the weight average molecular weight of the conjugated diene polymer block ($D^a$) of the block copolymer A can be made larger as compared with the case where the conjugated diene monomer is not added. Also, a polymerization terminator (water, methanol or the like) may be added to the solution containing the aromatic vinyl-conjugated diene block copolymer having an active terminal which has not reacted with the coupling agent, by an amount smaller than the equivalent of the active terminal. When a polymerization terminator is added as such, the active terminal of the aromatic vinyl-conjugated diene block copolymer (diblock form) is deactivated, and thereby, the aromatic vinyl-conjugated diene block copolymer (diblock form) thus obtainable is included in the block copolymer composition.

In the method for producing the block copolymer composition of the present embodiment, the intended block copolymer composition is collected from the solution containing the block copolymer A and the block copolymer B, which is obtainable as described above. The method of collection may be carried out according to a conventional method, and is not particularly limited. For example, a polymerization terminator such as water, methanol, ethanol, propanol, hydrochloric acid or citric acid is added, if necessary, after completion of the reaction, and furthermore, if necessary, additives such as an antioxidant are added. Then, the block copolymer composition can be collected by applying a known method such as a direct drying method or a steam stripping method to the solution. In case where the block copolymer composition is collected in the form of slurry by applying steam stripping or the like, the slurry is dehydrated using any dehydrator such as an extruder type squeezer to produce crumb having a water content that is equal to or less than a predetermined value. The crumb may be further dried using any dryer such as a band dryer or an expansion-extrusion dryer. The block copolymer composition obtainable as described above may be processed into a pellet form or the like according to a conventional method and then supplied for use.

According to the method for producing the block copolymer composition of the present embodiment, since the block copolymer A and the block copolymer B can be continuously obtained in a same reaction vessel, the target block copolymer composition can be obtained with superior productivity as compared with the case of individually producing the respective block copolymers and mixing them. Furthermore, since the various polymer blocks of the respective block copolymers in the resulting block copolymer composition have weight average molecular weights that are balanced in a particularly desirable manner in view of the block copolymer composition of the present embodiment, there is obtained a composition in which a high elastic modulus and a small permanent set are very well balanced.

There are no particular limitations on the use of the block copolymer composition of the present embodiment, and the block copolymer composition can be used in, for example, the applications for molding materials that are used in elastic films, gloves, elastic bands, condoms, OA appliances, various rolls for office machinery, vibration-proofing sheets for electric and electronic instruments, vibration-proofing rubber, shock-absorbing sheets, impact buffer films/sheets, residential damping sheets, vibration damper materials, and the like; in the applications for adhesives that are used in adhesive tapes, adhesive sheets, adhesive labels, dust-catching rollers and the like; in the applications for adhesives that are used in hygiene products or bookbinding; and in the applications for elastic fibers that are used in clothes, sports goods and the like. Among these, the block copolymer composition of the present embodiment is particularly suitably used as a material for elastic films that are used in hygiene products such as disposable diapers and sanitary products, since the block copolymer composition has both a high elastic modulus and a small permanent set, and since the elastic modulus does not easily vary even when the composition is repeatedly elongated and contracted.

There are no particular limitations on the method of molding the block copolymer composition of the present embodiment into a film, and conventionally known film forming methods can be applied. However, from the viewpoint of obtaining a smooth film with satisfactory productivity, extrusion molding is suitable, and among others, extrusion molding using a T-die is particularly suitable. A specific example of the extrusion molding using a T-die may be a method of extruding the block copolymer composition which has been melted to a temperature of 150° C. to 250° C., from a T-die attached to a single-screw extruder or a twin-screw extruder, and winding the film while cooling with a take-up roll. The film may be stretched upon the cooling with a take-up roll. Furthermore, during the winding of the film, film forming may be achieved while molten material of the block copolymer composition is coated on a substrate formed from polyethylene terephthalate, polyethylene, polypropylene, nonwoven fabric or release paper, or film forming may be achieved by sandwiching the molten material of the block copolymer composition between those substrates. The film thus obtained may be used in the form of still being integrated with the substrate, or may be peeled away from the substrate before use. The block copolymer composition of the present embodiment produces a highly isotropic film which has uniform mechanical properties in all plane directions even when the film is subjected to a molding method which is likely to cause molecular orientation, such as extrusion molding. Therefore, in regard to the block copolymer composition of the present embodiment, when it is not desired to have the resulting film imparted with anisotropy attributable to molecular orientation (for example, in the case of using the film as an elastic film that is used in a hygiene product such as a disposable diaper or a sanitary product, even if it is wished to obtain a feeling of wear for the hygiene product that is close to the feeling of wear for ordinary underwear), a film can be formed by applying a molding method which is likely to cause molecular orientation, such as extrusion molding. Furthermore, unevenness in the thickness or the like, which is attributed to the occurrence of anisotropy, does not easily occur, and films can be formed with high productivity.

The thickness of the film that is obtained from the block copolymer composition of the present embodiment is adjusted in accordance with the use, but in the case of forming a film for hygiene products such as disposable diapers or sanitary products, the thickness is usually 0.01 to 50 mm, preferably 0.03 to 1 mm, and more preferably 0.05 to 0.5 mm.

The film obtainable from the block copolymer composition of the present embodiment can be used in the form of a laminate with other members. For example, an elastic gather member can be formed by slit processing a film obtained from the block copolymer composition of the present embodiment, subsequently applying a hot melt adhesive or the like on the processed film to obtain a tape, adhering this tape to a nonwoven fabric, a woven fabric, a plastic film or a laminate thereof while the tape is in a shrunk state, and mitigating the shrinkage of the tape. Furthermore, the film may also be appropriately processed by a known method in accordance with other applications, and can be used as an elastic member for elastic base materials for poultice, gloves, surgical gloves, finger cots, hemostatic bands, birth control devices, head bands, goggle bands, rubber bands and the like.

2. Second Embodiment

Next, a second embodiment of the block copolymer composition of the present invention will be described. The block copolymer composition of the present embodiment contains at least three kinds of block copolymers.

A block copolymer P, which is one of the three kinds of block copolymers constituting the block copolymer composition of the present embodiment, is a linear aromatic vinyl-conjugated diene-aromatic vinyl block copolymer represented by the following Formula (P), which has two aromatic vinyl polymer blocks having weight average molecular weights that are different from each other.

$$Ar1^P-D^P-Ar2^P \qquad (P)$$

In the Formula (P), $Ar1^P$ represents an aromatic vinyl polymer block having a weight average molecular weight of 6,000 to 20,000; $Ar2^P$ represents an aromatic vinyl polymer block having a weight average molecular weight of 40,000 to 400,000; and $D^P$ represents a conjugated diene polymer block having a vinyl bond content of 1 mol % to 20 mol %.

A block copolymer Q, which is another one of the three kinds of block copolymers constituting the block copolymer composition of the present embodiment, is a linear block copolymer represented by the following Formula (Q).

$$(Ar^q-D^q)_2-X^q \qquad (Q)$$

In the Formula (Q), each of $Ar^q$ represents an aromatic vinyl polymer block having a weight average molecular weight of 6,000 to 20,000; each of $D^q$ represents a conjugated diene polymer block having a vinyl bond content of 1 mol % to 20 mol %; and $X^q$ represents a single bond or a residue of a coupling agent.

A block copolymer R, which is still another one of the three kinds of block copolymers constituting the block copolymer composition of the present embodiment, is a branched block copolymer represented by the following Formula (R).

$$(Ar^r-D^r)_m-X^r \qquad (R)$$

In the Formula (R), each of $Ar^r$ represents an aromatic vinyl polymer block having a weight average molecular weight of 6,000 to 20,000; each of $D^r$ represents a conjugated diene polymer block having a vinyl bond content of 1 mol % to 20 mol %; $X^r$ represents a residue of a coupling agent; and m represents an integer of 3 or greater.

The aromatic vinyl polymer blocks ($Ar1^P$, $Ar2^P$, $Ar^q$, and $Ar^r$) of the block copolymer P, the block copolymer Q and the block copolymer R are polymer blocks each constituted of an aromatic vinyl monomer unit. Examples of aromatic vinyl monomers that can be used to constitute the aromatic vinyl monomer units of the aromatic vinyl polymer blocks include the same aromatic vinyl monomers as those described in the section "1. First embodiment."

The aromatic vinyl polymer blocks ($Ar1^P$, $Ar2^P$, $Ar^q$, and $Ar^r$) of the block copolymer P, the block copolymer Q and the block copolymer R may respectively include a monomer unit other than the aromatic vinyl monomer unit. Examples of monomers that constitute the monomer unit other than the aromatic vinyl monomer unit, which can be included in the aromatic vinyl polymer blocks, and the content of the monomers, are defined to be the same as those described in the section "1. First embodiment."

The conjugated diene polymer blocks ($D^P$, $D^q$ and $D^r$) of the block copolymer P, the block copolymer Q, and the block copolymer R are polymer blocks each constituted of a conjugated diene monomer unit. Examples of the conjugated diene monomer that is used to constitute the conjugated diene monomer units of the conjugated diene polymer blocks include the same conjugated diene monomers as those described in the section "1. First embodiment."

The conjugated diene polymer blocks ($D^P$, $D^q$ and $D^r$) of the block copolymer P, the block copolymer Q and the block copolymer R may respectively include a monomer unit other than the conjugated diene monomer unit. Examples of monomers that constitute the monomer unit other than the conjugated diene monomer unit, which can be included in the conjugated diene polymer blocks, and the content of the monomers, are defined to be the same as those described in the section "1. First embodiment."

The block copolymer P that constitutes the block copolymer composition of the present embodiment is a linear asymmetric aromatic vinyl-conjugated diene-aromatic vinyl block copolymer composed of an aromatic vinyl polymer block ($Ar1^P$) having a relatively small weight average molecular weight, a conjugated diene polymer block ($D^P$) having a specific vinyl bond content, and an aromatic vinyl polymer block ($Ar2^P$) having a relatively large weight average molecular weight, linked in this order in a linear form, as represented by the Formula (P). The weight average molecular weight ($Mw(Ar1^P)$) of the aromatic vinyl polymer block ($Ar1^P$) having a relatively small weight average molecular weight is 6,000 to 20,000, preferably 7,000 to 18,000, and more preferably 8,000 to 15,000. If the value of $Mw(Ar1^P)$ does not fall in this range, there is a risk that the resulting composition may have an insufficient permanent set. Furthermore, the weight average molecular weight ($Mw(Ar2^P)$) of the aromatic vinyl polymer block ($Ar2^P$) having a relatively large weight average molecular weight is 40,000 to 400,000, preferably 42,000 to 370,000, and more preferably 45,000 to 350,000. If the value of $Mw(Ar2^P)$ is too small, there is a risk that the resulting composition may have an insufficient permanent set. On the other hand, a block copolymer P having an excessively large value of $Mw(Ar2^P)$ may be difficult to produce.

In the block copolymer P, there are no particular limitations on the ratio ($Mw(Ar2^P)/Mw(Ar1^P)$) of the weight average molecular weight ($Mw(Ar2^P)$) of the aromatic vinyl polymer block ($Ar2^P$) having a relatively large weight average molecular weight and the weight average molecular weight ($Mw(Ar1^P)$) of the aromatic vinyl polymer block ($Ar1^P$) having a relatively small weight average molecular weight, but the ratio is usually 2 to 67, preferably 4 to 40, and more preferably 4.5 to 35. When the block copolymer P is constructed as such, a block copolymer composition which has a lower permanent set and a higher elastic modulus and is highly elastic, can be obtained.

The vinyl bond content of the conjugated diene polymer block ($D^P$) of the block copolymer P (the content of 1,2-vinyl bonds and 3,4-vinyl bonds in all the conjugated diene monomer units) is defined to be the same as that for the conjugated diene polymer block ($D^a$) of the block copolymer A described in the section "1. First embodiment."

The weight average molecular weight ($Mw(D^P)$) of the conjugated diene polymer block ($D^P$) of the block copolymer P is not particularly limited, but is usually 20,000 to 200,000, preferably 35,000 to 150,000, and more preferably 45,000 to 100,000.

The content of the aromatic vinyl monomer units relative to the total amount of the monomer units of the block copolymer P, and the overall weight average molecular weight of the block copolymer P, are defined to be the same as those for the block copolymer A described in the section "1. First embodiment."

The block copolymer Q constituting the block copolymer composition of the present embodiment is a linear aromatic vinyl-conjugated diene-aromatic vinyl block copolymer in which two diblock forms ($Ar^q-D^q$), each of which is composed of an aromatic vinyl polymer block ($Ar^q$) having a specific weight average molecular weight linked to a conjugated diene polymer block ($D^q$) having a specific vinyl bond content, are linked directly by a single bond or via a coupling agent residue, such that the aromatic vinyl polymer block ($Ar^q$) side comes as the terminal, as represented by the Formula (Q). The weight average molecular weights ($Mw(Ar^q)$)

of the two aromatic vinyl polymer blocks ($Ar^q$) included in the block copolymer Q are each 6,000 to 20,000, preferably 7,000 to 18,000, and more preferably 8,000 to 15,000. If the value of Mw($Ar^q$) does not fall in this range, there is a risk that the resulting composition may have an insufficient permanent set. If the weight average molecular weights (Mw($Ar^q$)) of the aromatic vinyl polymer blocks which are present in two in one molecule are in the range described above, the weight average molecular weights may be identical with or different from one another; however, it is preferable that the weight average molecular weights be substantially identical. Furthermore, it is more preferable that the weight average molecular weights (Mw))($Ar^q$) of these plural aromatic vinyl polymer blocks be substantially identical with the weight average molecular weight (Mw($Ar1^P$)) of the aromatic vinyl polymer block ($Ar1^P$) having a relatively small weight average molecular weight in the block copolymer P.

The vinyl bond content of the conjugated diene polymer block) ($D^q$) of the block copolymer Q is defined to be the same as that of the conjugated diene polymer block ($D^b$) of the block copolymer B described in the section "1. First embodiment."

Furthermore, it is preferable that the vinyl bond content of the conjugated diene polymer block ($D^p$) of the block copolymer Q be substantially identical with the vinyl bond content of the conjugated diene polymer block ($D^p$) of the block copolymer P.

There are no particular limitations on the weight average molecular weight (Mw))($D^q$) of the conjugated diene polymer block) ($D^q$) of the block copolymer Q, but the weight average molecular weight is usually 20,000 to 200,000, preferably 35,000 to 150,000, and more preferably 45,000 to 100,000. When the weight average molecular weight (Mw)) ($D^q$) is in this range, a highly elastic block copolymer composition having a lower permanent set and a higher elastic modulus can be obtained. It is preferable that the weight average molecular weight (Mw))($D^q$) of the conjugated diene polymer block ($D^q$) of the block copolymer Q be substantially identical with the weight average molecular weight (Mw ($D^p$)) of the conjugated diene polymer block ($D^p$) of the block copolymer P. When these weight average molecular weights are substantially identical, the resulting block copolymer composition acquires a higher elastic modulus and becomes highly elastic.

The content of the aromatic vinyl monomer unit relative to the total amount of the monomer units of the block copolymer Q is defined to be the same as that of the block copolymer B described in the section "1. First embodiment." There are no particular limitations also on the overall weight average molecular weight of the block copolymer Q, but the overall weight average molecular weight is usually 60,000 to 400,000, preferably 80,000 to 300,000, and more preferably 100,000 to 200,000.

The block copolymer R that constitutes the block copolymer composition of the present embodiment is a branched block copolymer in which three or more diblock forms ($Ar^r$–$D^r$), each composed of an aromatic vinyl polymer block ($Ar^r$) having a specific weight average molecular weight linked to a conjugated diene polymer block ($D^r$) having a specific vinyl bond content, are linked via a coupling agent residue (X) such that the aromatic vinyl polymer block ($Ar^r$) side comes as the terminal, as represented by Formula (R). The weight average molecular weights (Mw($Ar^r$)) of the plural aromatic vinyl polymer blocks ($Ar^r$) included in the block copolymer R are each 6,000 to 20,000, preferably 7,000 to 18,000, and more preferably 8,000 to 15,000. If the value of Mw($Ar^r$) does not fall in this range, there is a risk that the resulting composition may have an insufficient permanent set. If the weight average molecular weights (Mw($Ar^r$)) of the aromatic vinyl polymer blocks which are present in three or more in one molecule are in the range described above, the weight average molecular weights may be identical with or different from one another; however, it is preferable that the weight average molecular weights be substantially identical. Furthermore, it is preferable that the weight average molecular weights (Mw($Ar^r$)) of these plural aromatic vinyl polymer blocks be substantially identical with at least one of the weight average molecular weight (Mw($Ar1^P$)) of the aromatic vinyl polymer block ($Ar1^P$) having a relatively small weight average molecular weight of the block copolymer P and the weight average molecular weight (Mw($Ar^q$)) of the aromatic vinyl polymer block ($Ar^q$) of the block copolymer Q, and it is more preferable that the weight average molecular weight (Mw($Ar^r$)) of the plural aromatic vinyl polymer blocks be substantially identical with both of these weight average molecular weights.

The vinyl bond content of the conjugated diene polymer block ($D^r$) of the block copolymer R is defined to be the same as that of the conjugated diene polymer block ($D^b$) of the block copolymer B described in the section "1. First embodiment." Furthermore, it is preferable that the vinyl bond content of the conjugated diene polymer block ($D^r$) of the block copolymer R be substantially identical with at least one of the vinyl bond contents of the conjugated diene polymer block ($D^p$) of the block copolymer P and the conjugated diene polymer block ($D^q$) of the block copolymer Q, and it is more preferable that the vinyl bond content of the conjugated diene polymer block ($D^r$) be substantially identical with both of these vinyl bond contents.

There are no particular limitations on the weight average molecular weight (Mw($D^r$)) of the conjugated diene polymer block ($D^r$) of the block copolymer R, but the weight average molecular weight is usually 20,000 to 200,000, preferably 35,000 to 150,000, and more preferably 45,000 to 100,000. When the weight average molecular weight (Mw($D^r$)) is in this range, a block copolymer composition which has a lower permanent set and a higher elastic modulus and is highly elastic, can be obtained. Furthermore, it is preferable that the weight average molecular weight (Mw($D^r$)) of the conjugated diene polymer block ($D^r$) of the block copolymer R be substantially identical with at least one of the weight average molecular weight (Mw($D^p$)) of the conjugated diene polymer block ($D^p$) of the block copolymer P and the weight average molecular weight (Mw($D^q$)) of the conjugated diene polymer block ($D^q$) of the block copolymer Q, and it is more preferable that the weight average molecular weight (Mw($D^r$)) be substantially identical with both of these molecular weights.

There are no particular limitations on the content of the aromatic vinyl monomer unit relative to the total amount of the monomer units of the block copolymer R, but the content is usually 10% to 35% by weight, preferably 12% to 32% by weight, and more preferably 14% to 30% by weight. It is preferable that the content of the aromatic vinyl monomer units relative to the total amount of the monomer units of the block copolymer R be substantially identical with the content of the aromatic vinyl monomer units relative to the total amount of the monomer units of the block copolymer Q. The overall weight average molecular weight of the block copolymer R is not particularly limited, but is usually 80,000 to 800,000, preferably 100,000 to 600,000, and more preferably 120,000 to 400,000.

There are no particular limitations on the molecular weight distribution, which is expressed as the ratio (Mw/Mn) of the weight average molecular weight (Mw) and the number average molecular weight (Mn), of the block copolymer P, the block copolymer Q and the block copolymer R constituting the block copolymer composition of the present embodiment, and of each of the polymer blocks constituting these block copolymers, but the molecular weight distribution is usually 1.1 or less, and preferably 1.05 or less.

There are no particular limitations on the weight ratio (P/(Q+R)) of the amount of the block copolymer P and the total amount of the block copolymer Q and the block copolymer R, which are contained in the block copolymer composition of the present embodiment, but the weight ratio is preferably 10/90 to 80/20, more preferably 36/64 to 80/20, even more preferably 38/62 to 80/20, and most preferably 40/60 to 75/25. When the respective block copolymers are included at such a ratio, a block copolymer composition having a particularly excellent in the balance between a high elastic modulus and a small permanent set is obtained. On the other hand, if this ratio is too small, there is a risk that the block copolymer composition may have an insufficient elastic modulus, and if this ratio is too large, there is a risk that the block copolymer composition may have a too large permanent set.

There are no particular limitations also on the weight ratio (Q/R) of the amount of the block copolymer Q and the amount of the block copolymer R, which are contained in the block copolymer composition of the present embodiment, and any value of the weight ratio may be used; however, the weight ratio is preferably 15/85 to 85/15, more preferably 17/83 to 83/17, and even more preferably 20/80 to 80/20. When the block copolymer Q and the block copolymer R are contained at such a ratio, the block copolymer composition acquires especially satisfactory moldability into film or the like, and the block copolymer composition is capable of producing molded products that are particularly highly isotropic even when a molding method which is likely to cause molecular orientation, such as extrusion molding, is applied.

It is desirable that the block copolymer composition of the present embodiment contains only the block copolymers P to R as the polymer components, but the block copolymer composition may contain a polymer component other than the block copolymers P to R. Examples of the polymer component other than the block copolymers P to R, which can be included in the block copolymer composition of the present embodiment, include an aromatic vinyl-conjugated diene-aromatic vinyl block copolymer other than the block copolymers P to R, an aromatic vinyl-conjugated diene block copolymer, an aromatic vinyl homopolymer, a conjugated diene homopolymer, an aromatic vinyl-conjugated diene random copolymer, and branched polymers thereof; as well as thermoplastic elastomers such as a polyurethane-based thermoplastic elastomer, a polyamide-based thermoplastic elastomer, and a polyester-based thermoplastic elastomer; and thermoplastic resins such as polyethylene, polypropylene, polyvinyl chloride, an acrylonitrile-styrene copolymer, an acrylonitrile-butadiene-styrene copolymer, and polyphenylene ether. In the block copolymer composition of the present embodiment, the content of the polymer component other than the block copolymers P to R is preferably 20% by weight or less, and more preferably 10% by weight or less, relative to the total amount of the polymer components.

In the block copolymer composition of the present embodiment, the content of the aromatic vinyl monomer units relative to all repeating units of the entirety of the polymer components included is defined to be the same as that of the block copolymer composition described in the section "1. First embodiment." This total content of the aromatic vinyl monomer units can be easily regulated by taking the contents of the block copolymer P, block copolymer Q, the block copolymer R, and a polymer component other than these, which constitute the block copolymer composition, and the contents of the respective aromatic vinyl monomer units into consideration, and regulating their amounts of incorporation.

The weight average molecular weights and the molecular weight distributions of all the polymer components constituting the block copolymer composition of the present embodiment are defined to be the same as those described in the section "1. First embodiment."

The melt index of the block copolymer composition of the present embodiment is defined to be the same as that described in the section "1. First embodiment."

The block copolymer composition of the present embodiment may contain components other than the polymer components, and such components other than the polymer components are defined to be the same as those described in the section "1. First embodiment."

There are no particular limitations on the method of obtaining the block copolymer composition of the present embodiment. For example, the block copolymer composition can be produced by separately producing the block copolymer P, the block copolymer Q and the block copolymer R according to a conventional method for producing block copolymers, incorporating other polymer components or various additives as necessary, and then mixing those components according to a conventional method such as kneading or solution mixing. However, from the viewpoint of obtaining the block copolymer composition of the present embodiment having a particularly preferred constitution with higher productivity, the method for producing the block copolymer composition of the present embodiment that will be described below is suitable.

The method for producing the block copolymer composition of the present embodiment comprises the following Processes of (6) to (10).

(6): Process of polymerizing an aromatic vinyl monomer by using a polymerization initiator in a solvent.

(7): Process of adding a conjugated diene monomer to the solution containing an aromatic vinyl polymer having an active terminal, which is obtained in the Process (6).

(8): Process of adding a bifunctional coupling agent and a tri- or higher-functional coupling agent to a solution containing an aromatic vinyl-conjugated diene block copolymer having an active terminal, which is obtained in the Process (7), by an amount such that the total amount of the functional groups relative to the active terminal is less than 1 molar equivalent, and thereby forming the block copolymer Q and the block copolymer R.

(9): Process of adding an aromatic vinyl monomer to a solution that is obtained in the Process (8), and thereby forming the block copolymer P.

(10): Process of collecting a block copolymer composition from a solution that is obtained in the Process (9).

In the method for producing the block copolymer composition of the present embodiment, first, an aromatic vinyl monomer is polymerized by using a polymerization initiator in a solvent. The polymerization initiator to be used, the amount of use thereof, the solvent to be used in the polymerization, and the amount thereof are defined to be the same as those described in the section "1. First embodiment."

When the block copolymer composition is obtained, a Lewis base compound may be added to the reactor that is used for the polymerization, in order to control the structures of the various polymer blocks of the respective block copolymers. This Lewis base compound and the timing for addition thereof are defined to be the same as those described in the section "1. First embodiment".

The polymerization reaction temperature is defined to be the same as that described in the section "1. First embodiment."

When an aromatic vinyl monomer is polymerized under the conditions described above by using a polymerization initiator in a solvent, a solution containing an aromatic vinyl polymer having an active terminal can be obtained. This aromatic vinyl polymer having an active terminal will constitute an aromatic vinyl polymer block ($Ar1^P$) having a relatively small weight average molecular weight of the block copolymer P, and an aromatic vinyl polymer block ($Ar^q$) of the block copolymer Q, and an aromatic vinyl polymer block ($Ar^r$) of the block copolymer R. Therefore, the amount of the aromatic vinyl monomer used at this time is determined in accordance with the intended weight average molecular weights of these block copolymers.

In the method for producing the block copolymer composition of the present embodiment, a conjugated diene monomer is added to this solution containing an aromatic vinyl polymer having an active terminal. Through this addition of the conjugated diene monomer, a conjugated diene polymer chain is formed from the active terminal, and thus a solution containing an aromatic vinyl-conjugated diene block copolymer (diblock form) having an active terminal is obtained. The amount of the conjugated diene monomer used at this time is determined such that the resulting conjugated diene polymer chain has the weight average molecular weight of the intended conjugated diene polymer block ($D^q$) of the block copolymer Q or the intended conjugated diene polymer block ($D^r$) of the block copolymer R.

In the method for producing the block copolymer composition of the present embodiment, a bifunctional coupling agent and a tri- or higher-functional coupling agent are added to this solution containing an aromatic vinyl-conjugated diene block copolymer (diblock form) having an active terminal. The amount of addition of these coupling agents at this time is such that the total amount of the functional groups of the coupling agents (functional groups capable of reacting with the active terminal of the polymer) relative to the active terminal of the aromatic vinyl-conjugated diene block copolymer (diblock form) having an active terminal contained in the solution, is less than 1 molar equivalent.

There are no particular limitations on the bifunctional coupling agent that is added in this process as long as the coupling agent has two functional groups which are capable of reacting with the active terminal of the polymer, in one molecule, and examples thereof that can be used include bifunctional halogenated silanes such as dichlorosilane, monomethyldichlorosilane, and dimethyldichlorosilane; bifunctional alkoxysilanes such as diphenyldimethoxysilane, and diphenyldiethoxysilane; bifunctional halogenated alkanes such as dichloroethane, dibromoethane, methylene chloride, and dibromomethane; bifunctional halogenated tin compounds such as dichlorotin, monomethyldichlorotin, dimethyldichlorotin, monoethyldichlorotin, diethyldichlorotin, monobutyldichlorotin, and dibutyldichlorotin; dibromobenzene, benzoic acid, CO, and 2-chloropropene. Among these, bifunctional halogenated silanes or bifunctional alkoxysilanes are particularly preferably used. These bifunctional coupling agents may be used singly, or two or more kinds may be used in combination.

Furthermore, there are no particular limitations on the type of the tri- or higher-functional coupling agent that is added in this process, and any tri- or higher-functional coupling agent can be used without any particular limitations, as long as the coupling agent has, in one molecule, three or more functional groups that are capable of reacting with the active terminal of the polymer. Examples of the trifunctional coupling agent are defined to the same as those described in the section "1. First embodiment."

In the process of adding these bifunctional coupling agent and tri- or higher-functional coupling agent, there are no particular limitations on the order of adding these coupling agents. Any one of them may be added, and then the other may be added, or both of them may be added simultaneously.

The total amount of the bifunctional coupling agent and the tri- or higher-functional coupling agent that are added may be determined in accordance with the weight ratio (P/(Q+R)) of the amount of the block copolymer P and the total amount of the block copolymer Q and the block copolymer R in the intended block copolymer composition. There are no particular limitations as long as the total amount of the functional groups of the coupling agents is less than 1 molar equivalent, relative to the active terminal of the aromatic vinyl-conjugated diene block copolymer (diblock form) having an active terminal contained in the solution. However, the total amount of the functional groups of the coupling agents relative to the active terminal of the polymer is in the range of 0.15 to 0.90 molar equivalents, and preferably in the range of 0.20 to 0.70 molar equivalents. Furthermore, the amount ratio of the bifunctional coupling agent and the tri- or higher-functional coupling agent to be added may be determined in accordance with the weight ratio (Q/R) of the amount of the block copolymer Q and the amount of the block copolymer R in the intended block copolymer composition, and for example, the amount ratio as a molar ratio of (the functional groups of the bifunctional coupling agent/the functional groups of the tri- or higher-functional coupling agent) is preferably in the range of 0.17 to 5.7, and more preferably in the range of 0.25 to 4.0.

As such, when a bifunctional coupling agent and a tri- or higher-functional coupling agent are added to the solution containing an aromatic vinyl-conjugated diene block copolymer (diblock form) having an active terminal, by an amount such that the total amount of the functional groups of the coupling agents relative to the active terminal is less than 1 molar equivalent, in a portion of the aromatic vinyl-conjugated diene block copolymer (diblock form) having an active terminal, one conjugated diene polymer block is bonded to another conjugated diene polymer block via the respective residues of the coupling agents. As a result, the block copolymer Q and the block copolymer R are formed. The remaining portion of the aromatic vinyl-conjugated diene block copolymer (diblock form) having an active terminal remains unreacted in the solution.

In the subsequent process, an aromatic vinyl monomer is added to the solution that is obtained as described above. When an aromatic vinyl monomer is added to the solution, an aromatic vinyl polymer chain is formed from the terminal of the aromatic vinyl-conjugated diene block copolymer (diblock form) having an active terminal, which has remained without reacting with the coupling agent. This aromatic vinyl polymer chain will constitute the aromatic vinyl polymer block ($Ar2^P$) having a relatively large weight average molecular weight of the block copolymer P, which constitutes the block copolymer composition. Therefore, the amount of the aromatic vinyl monomer used at this time is determined in accordance with the intended weight average molecular weight of the aromatic vinyl polymer block ($Ar2^P$). Through this process of adding an aromatic vinyl monomer, an asymmetric aromatic vinyl-conjugated diene-aromatic vinyl block copolymer which constitutes the block copolymer P is formed, and as a result, a solution containing the block copolymers P to R is obtained. Furthermore, prior to this process of adding an aromatic vinyl monomer, a conjugated diene monomer may be added to the solution containing an aromatic vinyl-conjugated diene block copolymer (diblock form) having an active terminal which has remained without reacting with the coupling agent. When a conjugated diene monomer is added as such, the weight average molecular weight of the conjugated diene polymer block (Dr) of the block copolymer P can be made larger as compared with the case where the conjugated diene monomer is not added. Also, a polymerization terminator (water, methanol, phenol or the like) may be added to the solution containing the aromatic vinyl-conjugated diene block copolymer having an active terminal which has not reacted with the coupling agent, by an amount smaller than the equivalent of the active terminal. When a polymerization terminator is added as such, the active terminal of the aromatic vinyl-conjugated diene block copolymer (diblock form) is deactivated, and thereby, the aromatic vinyl-conjugated diene block copolymer (diblock form) thus obtainable is included in the block copolymer composition.

In the method for producing the block copolymer composition of the present embodiment, the intended block copolymer composition is collected from the solution containing the block copolymers P to R that is obtained as described above. The method for collection may be carried out according to a conventional method, and is defined to be the same as that described in the section "1. First embodiment."

According to the method for producing the block copolymer composition of the present embodiment, since the block copolymers P to R can be continuously obtained in a same reaction vessel, the target block copolymer composition can be obtained with superior productivity as compared with the case of individually producing the respective block copolymers and mixing them. Furthermore, since the various polymer blocks of the respective block copolymers in the resulting block copolymer composition have weight average molecular weights that are balanced in a particularly desirable manner in view of the block copolymer composition of the present embodiment, there is obtained a composition in which a high elastic modulus and a small permanent set are very well balanced.

There are no particular limitations on the use of the block copolymer composition of the present embodiment, and the use is defined to be the same as that described in the section "1. First embodiment."

There are no particular limitations on the method of molding the block copolymer composition of the present embodiment into a film, and conventionally known film forming methods can be applied. The method of forming is defined to be the same as that described in the section "1. First embodiment."

The thickness of the film obtainable from the block copolymer composition of the present embodiment is adjusted in accordance with the use, and the thickness is defined to be same as that described in the section "1. First embodiment."

The film obtainable from the block copolymer composition of the present embodiment can be used in the form of a laminate with other members. For example, the film can be used in the same manner as described in the section "1. First embodiment."

EXAMPLES

Hereinafter, the present invention will be more specifically described by way of Examples and Comparative Examples. In the respective Examples, unless particularly stated otherwise, the units "part" and "percentage (%)" are on a weight basis.

Various analyses were carried out according to the following methods.

[Weight Average Molecular Weights of Block Copolymers and Block Copolymer Composition]

The weight average molecular weight was determined as a molecular weight relative to polystyrene standards, by high performance liquid chromatography using tetrahydrofuran as a carrier at a flow rate of 0.35 ml/min. For the apparatus, HLC8220™ manufactured by Tosoh Corporation was used, and three connected columns of Shodex KF-404HQ™ manufactured by Showa Denko K.K. (column temperature 40° C.) were used. A differential refractometer and an ultraviolet detector were used as the detectors, and the correction of molecular weight was carried out using 12 samples of standard polystyrenes (from 500 to 3,000,000) manufactured by Polymer Laboratories, Ltd.

[Weight Ratios of Block Copolymers]

The weight ratios were determined from the area ratios of the peaks corresponding to the respective block copolymers in the charts obtained by high performance liquid chromatography as described above.

[Weight Average Molecular Weight of Styrene Polymer Block]

The block copolymer was allowed to react with ozone and was reduced with lithium aluminum hydride according to the method described in Rubber Chem. Technol., 45, 1295 (1972), and thereby the isoprene polymer block of the block copolymer was decomposed. Specifically, the operation was carried out by the following procedure. That is, 300 mg of a sample was dissolved in a reaction vessel charged with 100 ml of dichloromethane that had been treated with a molecular sieve. This reaction vessel was placed in a cooling bath and was kept at −25° C. While oxygen was passed into the reaction vessel at a flow rate of 170 ml/min, ozone generated by an ozone generator was introduced into the reaction vessel. After a lapse of 30 minutes from the initiation of reaction, the gas flowing out from the reaction vessel was introduced into an aqueous solution of potassium iodide, and thereby completion of the reaction was confirmed. Subsequently, 50 ml of diethyl ether and 470 mg of lithium aluminum hydride were introduced into another reaction vessel which had been substituted with nitrogen, and while the reaction vessel was cooled with ice water, the ozone-reacted solution was slowly added dropwise to this reaction vessel. Then, the reaction vessel was placed in a water bath and gradually heated, and the content of the reaction vessel was heated to reflux for 30 minutes at 40° C. Subsequently, dilute hydrochloric acid was added dropwise in small amounts to the reaction vessel while the solution was stirred, and the dropwise addition was continued until the generation of hydrogen was almost undetectable. After this reaction, the solid product formed in this solution was separated by filtration, and the solid product was extracted with 100 ml of diethyl ether for 10 minutes. This extract was combined with the filtrate obtained at the time of separation by filtration, and the solvent was distilled off to obtain a solid sample. The sample thus obtained was analyzed for the weight average molecular weight according to the method for measuring the weight average molecular weight, and the value thereof was designated as the weight average molecular weight of a styrene polymer block.

[Weight Average Molecular Weight of Isoprene Polymer Block]

From the respective weight average molecular weights of the block copolymer determined as described above, the weight average molecular weight of a corresponding styrene polymer block was subtracted, and the weight average molecular weight of an isoprene polymer block was determined based on the calculated values.

[Styrene Unit Content of Block Copolymer]

The styrene unit content was determined based on the intensity ratio of the detection made by the differential refractometer and the ultraviolet detector in the analysis made by high performance liquid chromatography as described above. Copolymers having different styrene unit contents were prepared in advance, and a calibration curve was produced using the copolymers.

[Styrene Unit Content of Block Copolymer Composition]

The styrene unit content was determined based on an analysis by proton NMR.

[Vinyl Bond Content of Isoprene Polymer Block]

The vinyl bond content was determined based on an analysis by proton NMR.

[Tensile Modulus of Film]

Two sheets of film were used, and the tensile modulus was measured in one sheet along the direction of melt flow at the time of molding, while the tensile modulus was measured in the other sheet along a direction perpendicular to the melt flow at the time of molding. The procedure of measurement was as follows. The film was elongated up to 100% using a Tensilon universal tester RTC-1210™ manufactured by Orientec Co., Ltd. at a tensile rate of 300 mm/min, and in the middle of the process, the tensile stress at 50% elongation was measured. Thus, the tensile modulus of the film at 50% elongation was determined, and this tensile modulus was recorded as the tensile modulus at the first elongation. For the measurement in the direction perpendicular to the melt flow, the measurement was carried out as follows. The film which had been elongated 100% at the first round measurement was returned to an elongation-free state, and then was elongated again up to 100% at a tensile rate of 300 mm/min. In the middle of the process, the tensile stress at 50% elongation was measured. Thus, the tensile modulus of the film at 50% elongation was determined, and this tensile modulus was recorded as the tensile modulus at the second elongation. It can be said that as the tensile modulus is higher, the film has a higher elastic modulus, and it can be said that as the ratio of (tensile modulus in the direction of melt flow/tensile modulus in the direction perpendicular to the melt flow) is closer to 1, the anisotropy of the tensile modulus is smaller. It can also be said that as the ratio of (tensile modulus at the first round measurement/tensile modulus at the second round measurement) is closer to 1, the change in the elastic modulus due to elongation and contraction is smaller.

[Permanent Set of Film]

The permanent set of the film was measured according to ASTM 412 using the Tensilon universal tester described above. Specifically, the sample form used was Die A, and the gauge length prior to elongation was set at 40 mm. The film was elongated at an elongation ratio of 200% and was maintained as such for 10 minutes. Subsequently, the film was suddenly contracted without elongating and returning, was left to stand for 10 minutes, and then the gauge length was measured. Thus, the permanent set was determined based on the following formula:

Permanent set(%)=$(L1-L0)/L0 \times 100$

L0: Gauge length prior to elongation (mm)

L1: Gauge length after contracting and standing for 10 minutes (mm)

In this measurement, two sheets of film were used, and the permanent set was measured in one sheet along the direction of melt flow at the time of molding, while the permanent set was measured in the other sheet along a direction perpendicular to the melt flow at the time of molding. Thus, the respective values were recorded.

[Film Formability]

The elongational viscosity of the film was measured as an index of formability (molding stability) of the block copolymer composition. The measurement procedure is as follows. An ARES rheometer manufactured by TA Instruments Japan Inc. was used as the measurement apparatus, and the ARES-EVF elongational viscosity fixture was used as the fixture. The measurement was carried out under the measurement conditions of an elongation rate of 10 $sec^{-1}$, a measurement time of 1.5 sec, and a measurement temperature of 200° C. As a sample, a film specimen having a thickness of 1 mm, which was produced by hot pressing a block copolymer at 150° C. for 2 minutes and was cut to a size of 10 mm in width and 20 mm in length, was used. Under these conditions, the elongational viscosities of the film at 100% elongation and 350% elongation were measured. If the elongational viscosity at 100% elongation is too high, it can be said that the film has inferior film formability. Also, if the elongational viscosity at 350% elongation is lower than the elongational viscosity at 100% elongation (if the value of elongational viscosity at 350%/elongational viscosity at 100% is less than 1), it can be said that the film has inferior molding stability.

Example 1

In a pressure resistant reactor, 23.3 kg of cyclohexane, 5.10 millimoles of N,N,N',N'-tetramethylethylenediamine (hereinafter, referred to as TMEDA), and 1.60 kg of styrene were added, and while the mixture was stirred at 40° C., 169.9 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Thereafter, 29.7 millimoles of tetrachlorosilane was added to the reactor as a coupling agent, and a coupling reaction was carried out for 2 hours. Thus, a branched styrene-isoprene block copolymer was formed, which would serve as a block copolymer B. Thereafter, while the temperature was controlled to be maintained at 50° C. to 60° C., 3.20 kg of styrene was continuously added to the reactor over one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 339.8 millimoles of methanol was added to the system as a polymerization terminator, the resulting mixture was thoroughly mixed, and the reaction was terminated. The amounts of the various agents used in the reaction are summarized in Table 1. A portion of the reaction liquid thus obtained was taken out, and the weight average molecular weights of the respective block copolymers and the block copolymer composition, the weight average molecular weights of the respective styrene polymer blocks, the weight average molecular weights of the respective isoprene polymer blocks, the styrene unit contents of the respective block copolymers, the styrene unit content of the block copolymer composition, and the vinyl bond content of the isoprene polymer block were determined. These values are presented in Table 2.

TABLE 1

|  | Example | | | Comparative Example | | | |
|---|---|---|---|---|---|---|---|
|  | 1 | 2 | 3 | 1 | 2 | 3 | 4 |
| Cyclohexane (Kg) | 23.3 | 23.3 | 23.3 | 23.3 | 23.3 | 23.3 | 23.3 |
| TMEDA (millimoles) | 5.10 | 5.56 | 4.85 | 5.00 | 7.90 | 0.95 | 5.09 |
| n-butyllithium (millimoles) | 169.9 | 185.0 | 161.6 | 166.7 | 263.2 | 63.6 | 169.6 |
| Styrene (kg) [$1^{st}$ stage of polymerization] | 1.60 | 1.55 | 1.60 | 1.90 | 3.00 | 4.30 | 1.92 |
| Isoprene (kg) [$2^{nd}$ stage of polymerization] | 5.20 | 5.20 | 5.35 | 8.10 | 7.00 | 5.20 | 5.20 |
| Tetrachlorosilane (millimoles) [After $2^{nd}$ stage of polymerization] | 29.7 | 35.2 | 33.9 | 12.5 | 62.4 | — | 16.9 |
| Dimethyldichlorosilane (millimoles) [After $2^{nd}$ stage of polymerization] | — | — | — | 50.0 | — | — | — |
| Methanol (millimoles) [After $2^{nd}$ stage of polymerization] | — | 9.25 | — | — | — | — | — |
| Styrene (kg) [$3^{rd}$ stage of polymerization] | 3.20 | 3.25 | 3.05 | — | — | 0.50 | 2.88 |
| Methanol (millimoles) [After $3^{rd}$ stage of polymerization] | 339.8 | 370.0 | 323.2 | 333.4 | 526.4 | 127.2 | 339.2 |

TABLE 2

|  | Example | | | Comparative Example | | | |
|---|---|---|---|---|---|---|---|
|  | 1 | 2 | 3 | 1 | 2 | 3 | 4 |
| Block copolymer A | | | | | | | |
| Weight average molecular weight of relatively small styrene block ($Ar1^a$) [$Mw(Ar1^a)$] | 10000 | 9000 | 10000 | (12000) | — | 9000 | (12000) |
| Weight average molecular weight of relatively large styrene block ($Ar2^a$) [$Mw(Ar2^a)$] | 73000 | 103000 | 200000 | (12000) | — | 76000 | (30000) |
| [$Mw(Ar2^a)$]/[$Mw(Ar1^a)$] | 7.3 | 11.4 | 20.0 | (1.0) | — | 8.4 | (2.5) |
| Weight average molecular weight of isoprene block ($D^a$) [$Mw(D^a)$] | 46000 | 36000 | 60000 | (146000) | — | 139000 | (50000) |
| Vinyl bond content of isoprene block ($D^a$) (%) | 7 | 7 | 7 | (7) | — | 7 | (7) |
| Weight average molecular weight of block copolymer A | 129000 | 148000 | 270000 | (170000) | — | 224000 | (92000) |
| Styrene unit content of block copolymer A (%) | 68 | 66 | 74 | (19) | — | 48 | (67) |
| Block copolymer B | | | | | | | |
| Weight average molecular weight of styrene block ($Ar^b$) | 10000 | 9000 | 10000 | 12000 | 13000 | — | 12000 |
| Weight average molecular weight of isoprene block ($D^b$) [$Mw(D^b)$] | 46000 | 36000 | 60000 | 73000 | 45000 | — | 50000 |
| Vinyl bond content of isoprene block ($D^b$) (%) | 7 | 7 | 7 | 7 | 7 | — | 7 |
| Weight average molecular weight of block copolymer B | 218000 | 187000 | 277000 | 330000 | 163000 | — | 210000 |
| Styrene unit content of block copolymer B (%) | 24 | 23 | 23 | 19 | 30 | — | 27 |

TABLE 2-continued

|  | Example | | | Comparative Example | | | |
| --- | --- | --- | --- | --- | --- | --- | --- |
|  | 1 | 2 | 3 | 1 | 2 | 3 | 4 |
| Block copolymer A/block copolymer B (weight ratio) Styrene-isoprene block copolymer | 56/44 | 58/42 | 38/62 | (80/20) | — | — | (67/33) |
| Weight average molecular weight of styrene block | — | 9000 | — | 12000 | 13000 | — | — |
| Weight average molecular weight of isoprene block | — | 36000 | — | 73000 | 45000 | — | — |
| Content relative to all polymer components in composition (%) Block copolymer composition (whole) | — | 5 | — | 10 | 5 | — | — |
| Weight average molecular weight | 168000 | 154000 | 220000 | 220000 | 183000 | 224000 | 130000 |
| Styrene unit content (%) Film performance | 48 | 48 | 46.5 | 19 | 30 | 48 | 48 |
| 50% tensile modulus in $1^{st}$ round measurement in the direction perpendicular to melt flow (MPa) | 1.24 | 1.11 | 1.01 | 0.48 | 0.61 | 5.41 | 5.05 |
| 50% tensile modulus in $2^{nd}$ round measurement in the direction perpendicular to melt flow (MPa) | 1.11 | 1.00 | 0.95 | 0.45 | 0.59 | 0.13 | 1.02 |
| Ratio of tensile moduli of $1^{st}$ round measurement/$2^{nd}$ round measurement | 1.1 | 1.1 | 1.1 | 1.1 | 1.0 | 41.6 | 5.0 |
| Permanent set in the direction perpendicular to melt flow (%) | 5 | 3 | 3 | 3 | 3 | 85 | 28 |
| 50% tensile modulus in $1^{st}$ round measurement in the direction of melt flow (MPa) | 1.50 | 1.30 | 1.13 | 0.48 | 3.08 | 6.32 | 6.25 |
| Ratio of tensile moduli in the direction perpendicular to melt flow/direction of melt flow | 1.2 | 1.2 | 1.1 | 1.0 | 5.1 | 1.2 | 1.2 |
| Permanent set in the direction of melt flow (%) | 8 | 5 | 4 | 3 | 18 | 88 | 40 |

100 Parts of the reaction liquid obtained as described above was mixed with 0.3 parts of 2,6-di-tert-butyl-p-cresol as an antioxidant, and the mixed solution was added dropwise in small amounts into hot water that was heated to 85° C. to 95° C., to thereby volatilize the solvent and to obtain a precipitate. This precipitate was crushed and dried in hot air at 85° C., and thus a block copolymer composition of Example 1 was collected. The composition thus obtained was supplied to a single-screw extruder equipped with an in-water hot cutting device at the front tip of the extruder, and the composition was fabricated into cylindrical pellets having an average diameter of 5 mm and an average length of about 5 mm.

Subsequently, the pellets of the block copolymer composition of Example 1 were heated to melt at 200° C. using a twin-screw extruder equipped with a T-die and were extruded continuously for 20 minutes, and thereby the pellets were formed into a film having a thickness of 0.2 mm. The tensile modulus and the permanent set of this film of Example 1 were measured. These results are presented in Table 2. The details of the conditions for film forming are as follows.

Rate of composition treatment: 15 kg/hr
Rate of film take-up: 10 m/min
Extruder temperature: Adjusted to 140° C. for the feed port, 160° C. for the T-die
Screw: Full-flight
Extruder L/D: 42
T-die: Width 300 mm, lip 1 mm

Example 2

In a pressure resistant reactor, 23.3 kg of cyclohexane, 5.56 millimoles of TMEDA, and 1.55 kg of styrene were added, and while the mixture was stirred at 40° C., 185.0 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Thereafter, 35.2 millimoles of tetrachlorosilane was added to the reactor as a coupling agent, and a coupling reaction was carried out for 2 hours. Thus, a branched styrene-isoprene block copolymer was formed, which would serve as a block copolymer B. Subsequently, 9.25 millimoles of methanol was added to the reactor, and thereby the active terminal of a portion of the styrene-isoprene block copolymer was deactivated. Thereafter, while the temperature was controlled to be maintained at 50° C. to 60° C., 3.25 kg of styrene was continuously added to the reactor over one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 370.0 millimoles of methanol was added to the system as a polymerization terminator, the resulting mixture was thoroughly mixed, and the reaction was terminated. A portion of the reaction liquid thus obtained was taken out, and the same measurements as in Example 1 were made. These values are presented in Table 2. The subsequent operation was carried out in the same manner as in Example 1, and a block copolymer composition of Example 2 was collected. The block copolymer composition was fabricated into pellets and was thereby formed into a film of Example 2. Measurements were made for this film. The results are presented in Table 2.

Example 3

The operation was carried out in the same manner as in Example 1, except that the amounts of styrene, n-butyllithium, TMEDA, isoprene, tetrachlorosilane and methanol were respectively changed as indicated in Table 1, and thus a block copolymer composition of Example 3 was collected. The block copolymer composition was fabricated into pellets, and thus a film of Example 3 was obtained. The same measurements as in Example 1 were carried out for the block copolymer composition and film of Example 3. The results are presented in Table 2.

Comparative Example 1

In a pressure resistant reactor, 23.3 kg of cyclohexane, 5.00 millimoles of TMEDA, and 1.90 kg of styrene were added, and while the mixture was stirred at 40° C., 166.7 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Thereafter, 50.0 millimoles of dimethyldichlorosilane and 12.5 millimoles of tetrachlorosilane were added to the reactor as coupling agents, and a coupling reaction was carried out for 2 hours. Thus, a styrene-isoprene-styrene block copolymer and a branched styrene-isoprene block copolymer were formed. Subsequently, 333.4 millimoles of methanol was added to the reaction liquid which was believed to have a styrene-isoprene block copolymer having an active terminal remaining therein. The resulting mixture was thoroughly mixed, and thereby the active terminal was deactivated. A portion of the reaction liquid thus obtained was taken out, and the same measurements as in Example 1 were made. These values are presented in Table 2. The subsequent operation was carried out in the same manner as in Example 1, and a block copolymer composition of Comparative Example 1 was collected. The block copolymer composition was fabricated into pellets and was thereby formed into a film of Comparative Example 1. Measurements were made for this film. The results are presented in Table 2.

Comparative Example 2

In a pressure resistant reactor, 23.3 kg of cyclohexane, 7.90 millimoles of TMEDA, and 3.00 kg of styrene were added, and while the mixture was stirred at 40° C., 263.2 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 7.00 kg of isoprene was continuously added to the reactor over one hour. After completion of the addition of isoprene, polymerization was carried out for another one hour. The polymerization conversion ratio for isoprene was 100%. Thereafter, 62.4 millimoles of tetrachlorosilane was added to the reactor as a coupling agent, and a coupling reaction was carried out for 2 hours. Thus, a branched styrene-isoprene block copolymer was formed. Subsequently, 526.4 millimoles of methanol was added to the reaction liquid which was believed to have a styrene-isoprene block copolymer having an active terminal remaining therein. The resulting mixture was thoroughly mixed, and thereby the active terminal was deactivated. A portion of the reaction liquid thus obtained was taken out, and the same measurements as in Example 1 were made. These values are presented in Table 2. The subsequent operation was carried out in the same manner as in Example 1, and a block copolymer composition of Comparative Example 2 was collected. The block copolymer composition was fabricated into pellets and was thereby formed into a film of Comparative Example 2. Measurements were made for this film. The results are presented in Table 2.

Comparative Example 3

In a pressure resistant reactor, 40.0 kg of cyclohexane, 0.95 millimoles of TMEDA, and 4.30 kg of styrene were added, and while the mixture was stirred at 40° C., 63.6 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Furthermore, while the temperature was controlled to be maintained at 50° C. to 60° C., 0.50 kg of styrene was continuously added to the reactor over 10 minutes. After completion of the addition of styrene, polymerization was carried out for another one hour. The polymerization conversion ratio for styrene was 100%. Subsequently, 127.2 millimoles of methanol was added to the system as a polymerization terminator, the resulting mixture was thoroughly mixed, and the reaction was terminated. A portion of the reaction liquid thus obtained was taken out, and the same measurements as in Example 1 were made. These values are presented in Table 2. The subsequent operation was carried out in the same manner as in Example 1, and a block copolymer composition of Comparative Example 3 was collected. The block copolymer composition was fabricated into pellets and was thereby formed into a film of Comparative Example 3. Measurements were made for this film. The results are presented in Table 2.

Comparative Example 4

The operation was carried out in the same manner as in Example 1, except that the amounts of styrene, n-butyllithium, TMEDA, isoprene, tetrachlorosilane and methanol were respectively changed as indicated in Table 1. A block copolymer composition of Comparative Example 4 was collected. The block copolymer composition was fabricated into pellets and was thereby formed into a film of Comparative Example 4. The same measurements as in Example 1 were made for the block copolymer composition and film of Comparative Example 4. The results are presented in Table 2.

The following matters were found from Table 2. That is, the films obtainable from the block copolymer compositions of the present invention are films having both a high elastic modulus and a small permanent set. Furthermore, their tensile moduli are less anisotropic, and the changes in the elastic modulus due to elongation and contraction are small (Examples 1 to 3). On the contrary, in compositions which have constitutions different from the constitution of the block copolymer composition of the present invention, when the total styrene (aromatic vinyl) unit content is made high in order to have a high elastic modulus, the compositions acquire large permanent sets, and the changes in the elastic modulus due to elongation and contraction are also increased (Comparative Examples 3 and 4). When the total styrene (aromatic vinyl) unit content is made low in order to have a small permanent set, the elastic modulus is decreased (Comparative Examples 1 and 2), and anisotropy of the elastic modulus is exhibited. As a result, the permanent set may increase depending on the direction of stretching (Comparative Example 2). Therefore, the compositions having constitutions different from the constitution of the block copolymer composition of the present invention could not achieve a good balance between a high elastic modulus and a small permanent set.

Example 4

In a pressure resistant reactor, 23.3 kg of cyclohexane, 4.80 millimoles of N,N,N',N'-tetramethylethylenediamine (hereinafter, referred to as TMEDA), and 1.55 kg of styrene were added, and while the mixture was stirred at 40° C., 160.8 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Thereafter, 7.2 millimoles of tetrachlorosilane was added to the reactor, and a coupling reaction was carried out for 30 minutes. Thus, a branched styrene-isoprene-styrene block copolymer was formed, which would serve as a block copolymer R. Thereafter, 50.6 millimoles of dimethyldichlorosilane was added to the reactor, and a coupling reaction was carried out for another one hour. Thus, a linear styrene-isoprene-styrene block copolymer was formed, which would serve as a block copolymer Q. Subsequently, while the temperature was controlled to be maintained at 50° C. to 60° C., 3.25 kg of styrene was continuously added to the reactor over one hour. After completion of the addition of styrene, polymerization was carried out for another one hour, and thus a linear asymmetric styrene-isoprene-styrene block copolymer was formed, which would serve as a block copolymer P. The polymerization conversion ratio for styrene was 1000. Subsequently, 321.6 millimoles of methanol was added to the system as a polymerization terminator, the resulting mixture was thoroughly mixed, and the reaction was terminated. The amounts of the various agents used in the reaction are summarized in Table 3. A portion of the reaction liquid thus obtained was taken out, and the weight average molecular weights of the respective block copolymers and the block copolymer composition, the weight ratios of the various block copolymers, the weight average molecular weights of the respective styrene polymer blocks, the weight average molecular weights of the respective isoprene polymer blocks, the styrene unit contents of the respective block copolymers, the styrene unit content of the block copolymer composition, and the vinyl bond content of the isoprene polymer block were determined. These values are presented in Table 4.

TABLE 3

| | Example | | Comparative Example | | | | | |
|---|---|---|---|---|---|---|---|---|
| | 4 | 5 | 5 | 6 | 7 | 8 | 9 | 10 |
| Cyclohexane (kg) | 23.3 | 23.3 | 23.3 | 23.3 | 23.3 | 23.3 | 23.3 | 23.3 |
| TMEDA (millimoles) | 4.8 | 4.6 | 1.9 | 2.3 | 1.2 | 4.5 | 4.1 | 0.8 |
| n-butyllithium (millimoles) | 160.8 | 153.1 | 128.8 | 156.0 | 77.9 | 80.0 | 80.0 | 14.1 |
| Styrene (kg) [1$^{st}$ stage of polymerization] | 1.55 | 1.38 | 1.50 | 2.20 | 4.15 | 3.14 | 2.60 | 1.24 |
| n-butyllithium (millimoles) [1$^{st}$ stage of polymerization, re-addition] | — | — | — | — | — | 220.0 | 190.0 | 43.2 |
| Styrene (kg) [1$^{st}$ stage of polymerization, re-addition] | — | — | — | — | — | 1.99 | 1.78 | 0.85 |
| Isoprene (kg) [2$^{nd}$ stage of polymerization] | 5.20 | 5.20 | 7.00 | 5.60 | 5.20 | 2.88 | 3.85 | 7.05 |

TABLE 3-continued

|  | Example | | Comparative Example | | | | | |
|---|---|---|---|---|---|---|---|---|
|  | 4 | 5 | 5 | 6 | 7 | 8 | 9 | 10 |
| Dimethyldimethoxysilane (millimoles) [After 2$^{nd}$ stage of polymerization] | 50.6 | 14.5 | — | — | — | — | — | — |
| Tetramethoxysilane (millimoles) [After 2$^{nd}$ stage of polymerization] | 7.2 | 16.8 | — | — | — | — | — | — |
| Styrene (kg) [3$^{rd}$ stage of polymerization] | 3.25 | 3.42 | 1.50 | 2.20 | 0.65 | 1.99 | 1.78 | 0.86 |
| Methanol (millimoles) [After 3$^{rd}$ stage of polymerization] | 321.6 | 306.2 | 257.6 | 312.0 | 155.9 | 600.0 | 540.0 | 114.6 |

TABLE 4

|  | Example | | Comparative Example | | | | | |
|---|---|---|---|---|---|---|---|---|
|  | 4 | 5 | 5 | 6 | 7 | 8 | 9 | 10 |
| Block copolymer P (Ar1$^p$-D$^p$-Ar2$^p$) | | | | | | | | |
| Weight average molecular weight of styrene block Ar1$^p$ | 10000 | 10000 | — | — | 15000 | 7300 | 7300 | 12000 |
| Weight average molecular weight of styrene block Ar2$^p$ | 151000 | 73000 | — | — | 76000 | 50500 | 43000 | 100000 |
| Weight average molecular weight of isoprene block D$^p$ | 53000 | 55000 | — | — | 133000 | 27000 | 34000 | 123000 |
| Vinyl bond content of isoprene block D$^p$ (%) | 7 | 7 | — | — | 7 | 7 | 7 | 9 |
| Weight average molecular weight of block copolymer P | 214000 | 138000 | — | — | 224000 | 84800 | 84300 | 235000 |
| Styrene unit content of block copolymer P (%) | 78 | 67 | — | — | 48 | 85 | 76 | 53 |
| Content in whole block copolymer composition (%) | 42 | 60 | — | — | 100 | 50 | 48 | 34 |
| Block copolymer Q ((Ar$^q$-D$^q$)$_2$-X$^q$) | | | | | | | | |
| Weight average molecular weight of styrene block Ar$^q$ | 10000 | 10000 | 13000 | 15000 | — | 7300 | 7300 | 12000 |
| Weight average molecular weight of isoprene block D$^q$ | 50000 | 51500 | 45000 | 30000 | — | 13500 | 17000 | 61500 |
| Vinyl bond content of isoprene block D$^q$ (%) | 7 | 7 | 7 | 7 | — | 7 | 7 | 9 |
| Weight average molecular weight of block copolymer Q | 120000 | 123000 | 116000 | 90000 | — | 41600 | 48600 | 147000 |
| Styrene unit content of block copolymer Q (%) | 23 | 21 | 30 | 44 | — | 58 | 48 | 19 |
| Content in whole block copolymer composition (%) | 44 | 12 | 100 | 100 | — | 50 | 52 | 66 |
| Block copolymer R ((Ar$^r$-D$^r$)$_m$-X$^r$) | | | | | | | | |
| Number of m/branches in Formula (R) | 4 | 4 | — | — | — | — | — | — |
| Weight average molecular weight of styrene block Ar$^r$ | 10000 | 10000 | — | — | — | — | — | — |

TABLE 4-continued

|  | Example | | Comparative Example | | | | | |
|---|---|---|---|---|---|---|---|---|
|  | 4 | 5 | 5 | 6 | 7 | 8 | 9 | 10 |
| Weight average molecular weight of isoprene block D'' | 43500 | 44750 | — | — | — | — | — | — |
| Vinyl bond content of isoprene block D'' (%) | 7 | 7 | — | — | — | — | — | — |
| Weight average molecular weight of block copolymer R | 214000 | 219000 | — | — | — | — | — | — |
| Styrene unit content of block copolymer R (%) | 23 | 21 | — | — | — | — | — | — |
| Content in whole block copolymer composition (%) | 14 | 28 | — | — | — | — | — | — |
| Weight ratios of various block copolymers |  |  |  |  |  |  |  |  |
| P/(Q + R) | 42/58 | 60/40 | 0/100 | 0/100 | 100/0 | 50/50 | 48/52 | 34/64 |
| Q/R | 76/24 | 30/70 | 100/0 | 100/0 | — | 100/0 | 100/0 | 100/0 |
| Block copolymer composition (whole) |  |  |  |  |  |  |  |  |
| Weight average molecular weight | 169000 | 157000 | 116000 | 90000 | 224000 | 63000 | 66000 | 175000 |
| Styrene unit content (%) | 48 | 48 | 30 | 44 | 48 | 71 | 62 | 30 |

100 Parts of the reaction liquid obtained as described above was mixed with 0.3 parts of 2,6-di-tert-butyl-p-cresol as an antioxidant, and the mixed solution was added dropwise in small amounts into hot water that was heated to 85° C. to 95° C., to thereby volatilize the solvent and to obtain a precipitate. This precipitate was crushed and dried in hot air at 85° C., and thus a block copolymer composition of Example 4 was collected. The composition thus obtained was supplied to a single-screw extruder equipped with an in-water hot cutting device at the front tip of the extruder, and the composition was fabricated into cylindrical pellets having an average diameter of 5 mm and an average length of about 5 mm.

Subsequently, the pellets of the block copolymer composition of Example 4 were heated to melt at 200° C. using a twin-screw extruder equipped with a T-die and were extruded continuously for 20 minutes, and thereby the pellets were formed into a film having a thickness of 0.2 mm. The tensile modulus and the permanent set of this film of Example 4 were measured, and film formability was evaluated for the block copolymer composition of Example 4. These results are presented in Table 5. The details of the conditions for film forming are as follows.

TABLE 5

|  | Example 4 | Example 5 | Comparative Example 5 | Comparative Example 6 | Comparative Example 7 | Comparative Example 8 | Comparative Example 9 | Comparative Example 10 |
|---|---|---|---|---|---|---|---|---|
| Film properties |  |  |  |  |  |  |  |  |
| 50% Tensile modulus in the direction perpendicular to melt flow (MPa) | 1.11 | 1.15 | 0.51 | 4.01 | 5.41 | 0.95 | 1.21 | 0.41 |
| Permanent set in the direction perpendicular to melt flow (%) | 3 | 4 | 6 | 17 | 85 | 80 | 30 | 3 |
| 50% Tensile modulus in the direction of melt flow (MPa) | 1.25 | 1.31 | 3.08 | 5.62 | 6.32 | 1.15 | 4.57 | 0.56 |
| Permanent set in the direction of melt flow (%) | 4 | 5 | 15 | 21 | 88 | 80 | 65 | 6 |

TABLE 5-continued

| | Example 4 | Example 5 | Comparative Example 5 | Comparative Example 6 | Comparative Example 7 | Comparative Example 8 | Comparative Example 9 | Comparative Example 10 |
|---|---|---|---|---|---|---|---|---|
| Ratio of tensile moduli in the direction of melt flow/direction perpendicular to melt flow Film formability | 1.1 | 1.1 | 6.0 | 1.4 | 1.2 | 1.2 | 3.8 | 1.5 |
| Elongational viscosity at 100% elongation (Pa·s) | 3200 | 3000 | 4400 | 6600 | 21000 | 8500 | 7700 | 7500 |
| Changes in elongational viscosity 350%/100% | 2.0 | 2.2 | 0.23 | 1.4 | 1.2 | 0.65 | 0.80 | 0.90 |

Example 5

The operation was carried out in the same manner as in Example 4, except that the amounts of styrene, n-butyllithium, TMEDA, dimethyldichlorosilane, tetramethoxysilane and methanol were respectively changed as indicated in Table 3. A block copolymer composition of Example 5 was collected and was fabricated into pellets, and thus a film of Example 5 was obtained. The same measurements as in Example 4 were carried out for the block copolymer composition and film of Example 5. The results are presented in Table 4 and Table 5.

Comparative Example 5

In a pressure resistant reactor, 23.3 kg of cyclohexane, 1.9 millimoles of TMEDA, and 1.50 kg of styrene were added, and while the mixture was stirred at 40° C., 128.8 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 7.00 kg of isoprene was continuously added to the reactor over one hour. After completion of the addition of isoprene, polymerization was carried out for another one hour. The polymerization conversion ratio for isoprene was 100%. Subsequently, while the temperature was controlled to be maintained at 50° C. to 60° C., 1.50 kg of styrene was continuously added to the reactor over one hour. After completion of the addition of styrene, polymerization was carried out for another one hour, and thus a styrene-isoprene-styrene triblock copolymer was formed. The polymerization conversion ratio for styrene was 100%. Subsequently, 257.6 millimoles of methanol was added to the system as a polymerization terminator, the resulting mixture was thoroughly mixed, and the reaction was terminated. A portion of the reaction liquid thus obtained was taken out, and the same measurements as in Example 4 were carried out. These values are presented in Table 4. The subsequent operation was carried out in the same manner as in Example 4, and a block copolymer composition of Comparative Example 5 was collected. The block copolymer composition was fabricated into pellets and was thereby formed into a film of Comparative Example 5. Measurements were made for this film. The results are presented in Table 5.

Comparative Example 6 and Comparative Example 7

The operation was carried out in the same manner as in Comparative Example 5, except that the amounts of styrene, n-butyllithium, TMEDA, isoprene and methanol were respectively changed as indicated in Table 3, and thus block copolymer compositions of Comparative Example 6 and Comparative Example 7 were collected. The block copolymer compositions were respectively fabricated into pellets, and thus films of Comparative Example 6 and Comparative Example 7 were obtained. The same measurements as in Example 4 were carried out for the block copolymer compositions and films of Comparative Example 6 and Comparative Example 7. The results are presented in Table 4 and Table 5.

Comparative Example 8

In a pressure resistant reactor, 23.3 kg of cyclohexane, 4.50 millimoles of TMEDA, and 3.14 kg of styrene were added, and while the mixture was stirred at 40° C., 80.0 millimoles of n-butyllithium was added thereto. While the temperature was elevated to 50° C., polymerization was carried out for one hour. Thereafter, 220.0 millimoles of n-butyllithium was added thereto, and subsequently, 1.99 kg of styrene was continuously added over 30 minutes. Polymerization was continued for one hour. The polymerization conversion ratio for styrene was 100%. Subsequently, while the temperature was controlled to be maintained at 50° C. to 60° C., 2.88 kg of isoprene was continuously added to the reactor over one hour. After completion of the addition of isoprene, polymerization was carried out for another one hour. The polymerization conversion ratio for isoprene was 100%. Thereafter, 1.99 kg of styrene was continuously added to the reaction for 30 minutes. After completion of the addition of styrene, polymerization was carried out for another one hour. Thus, two kinds of linear styrene-isoprene-styrene block copolymers were formed. The polymerization conversion ratio for styrene was 100%. Thereafter, 600.0 millimoles of methanol was added to the reactor as a polymerization terminator, the mixture was thoroughly mixed, and thus the reaction was terminated. A portion of the reaction liquid thus obtained was taken out, and the same measurements as in Example 4 were carried out. These values are presented in Table 4. The subsequent operation was carried out in the same manner as in Example 4, and a block copolymer composition of Comparative Example 8 was collected. The block copolymer composition was fabricated into pellets and was thereby formed into a film of Comparative Example 8. Measurements were made for this film. The results are presented in Table 5.

Comparative Example 9 and Comparative Example 10

The operation was carried out in the same manner as in Comparative Example 8, except that the amounts of styrene, n-butyllithium, TMEDA, isoprene and methanol were respectively changed as indicated in Table 3, and thus block copolymer compositions of Comparative Example 9 and Comparative Example 10 were collected. The block copolymer compositions were respectively fabricated into pellets, and thus films of Comparative Example 9 and Comparative Example 10 were obtained. The same measurements as in Example 4 were carried out for the block copolymer compositions and films of Comparative Example 9 and Comparative Example 10. The results are presented in Table 4 and Table 5.

The following matters were found from Table 4 and Table 5. That is, the films formed using the block copolymer compositions of the present invention are films having both a high elastic modulus and a small permanent set. Furthermore, their tensile moduli are less anisotropic, and the compositions are excellent in the film formability and the molding stability (Examples 4 and 5). On the contrary, in case where compositions which have constitutions different from the constitution of the block copolymer composition of the present invention are used, when the total styrene (aromatic vinyl) unit content is made high in order to have a high elastic modulus, the compositions have large permanent sets (Comparative Examples 6 to 9). When the total styrene (aromatic vinyl) unit content is made low in order to make the permanent set small, the compositions have low elastic moduli (Comparative Example 5 and Comparative Example 10). Furthermore, the compositions exhibit anisotropy of elastic modulus, and are inferior in the film formability and the molding stability (Comparative Examples 5 to 10).

INDUSTRIAL APPLICABILITY

The present invention can be used in the applications for molding materials that are used in elastic films, gloves, elastic bands, condoms, OA appliances, various rolls for office machinery, vibration-proofing sheets for electric and electronic instruments, vibration-proofing rubber, shock-absorbing sheets, impact buffer films/sheets, residential damping sheets, vibration damper materials, and the like; in the applications for adhesives that are used in adhesive tapes, adhesive sheets, adhesive labels, dust-catching rollers and the like; in the applications for adhesives that are used in hygiene products or bookbinding; and in the applications for elastic fibers that are used in clothes, sports goods and the like. Among these, the block copolymer composition of the present invention is particularly suitably used as a material for elastic films that are used in hygiene products such as disposable diapers and sanitary products, since the block copolymer composition has both a high elastic modulus and a small permanent set, and since the elastic modulus does not easily vary even when the composition is repeatedly elongated and contracted.

The invention claimed is:

1. A block copolymer composition comprising a block copolymer A represented by the following Formula (A) and a block copolymer B represented by the following Formula (B), wherein a weight ratio (A/B) between the block copolymer A and the block copolymer B is 36/64 to 85/15:

$$Ar1^a-D^a-Ar2^a \tag{A}$$

$$(Ar^b-D^b)_n-X \tag{B},$$

in the Formulae (A) and (B), $Ar1^a$ and $Ar^b$ each represent an aromatic vinyl polymer block having a weight average molecular weight of 6,000 to 15,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a residue of a coupling agent; and n represents an integer of 3 or greater.

2. The block copolymer composition according to claim 1, wherein a content of an aromatic vinyl monomer unit relative to all repeating units of polymer components in the block copolymer composition is 27% to 70% by weight.

3. A film formed by molding the block copolymer composition according to claim 1.

4. A method for producing the block copolymer composition according to claim 1, comprising the following Processes (1) to (5) of:
   (1): polymerizing an aromatic vinyl monomer by using a polymerization initiator in a solvent;
   (2): adding a conjugated diene monomer to a solution containing an aromatic vinyl polymer having an active terminal, which is obtained in the Process (1);
   (3): adding a tri-or higher-functional coupling agent to a solution containing an aromatic vinyl-conjugated diene block copolymer having an active terminal, which is obtained in the Process (2), by an amount such that an amount of functional groups of the coupling agent relative to the active terminal is less than 1 molar equivalent, and thereby forming the block copolymer B;
   (4): adding an aromatic vinyl monomer to a solution that is obtained in the Process (3), and thereby forming the block copolymer A; and
   (5): collecting the block copolymer composition from a solution that is obtained in the Process (4).

5. A block copolymer composition comprising a block copolymer P represented by the following Formula (P), a block copolymer Q represented by the following Formula (Q), and a block copolymer R represented by the following Formula (R), wherein a weight ratio (P/(Q+R)) between an amount of the block copolymer P, and a total amount of the block copolymer Q and the block copolymer R is 10/90 to 80/20:

$$Ar1^p-D^p-Ar2^p \tag{P}$$

$$(Ar^q-D^q)_2-X^q \tag{Q}$$

$$(Ar^r-D^r)_m-X^r \tag{R},$$

in the Formulae (P), (Q) and (R), $Ar1^p$, $Ar^q$ and $Ar^r$ each represent an aromatic vinyl polymer block having a weight average molecular weight of 6,000 to 20,000; $Ar2^p$ represents an aromatic vinyl polymer block having a weight average molecular weight of 40,000 to 400,000; $D^p$, $D^q$ and $D^r$ each represent a conjugated diene polymer block having a vinyl bond content of 1 mol % to 20 mol %; $X^q$ represents a single bond, or a residue of a coupling agent; $X^r$ represents a residue of a coupling agent; and m represents an integer of 3 or greater.

6. The block copolymer composition according to claim 5, wherein a weight ratio (Q/R) between an amount of the block copolymer Q and an amount of the block copolymer R is 15/85 to 85/15.

7. The block copolymer composition according to claim 5, wherein a content of an aromatic vinyl monomer unit relative to all repeating units of polymer components in the block copolymer composition is 27% to 70% by weight.

8. A film formed by molding the block copolymer composition according to claim 5.

9. A method for producing the block copolymer composition according to claim 5, comprising the following Processes (6) to (10) of:
- (6): polymerizing an aromatic vinyl monomer by using a polymerization initiator in a solvent;
- (7): adding a conjugated diene monomer to a solution containing an aromatic vinyl polymer having an active terminal, which is obtained in the Process (6);
- (8): adding a bifunctional coupling agent and a tri- or higher-functional coupling agent to a solution containing an aromatic vinyl-conjugated diene block copolymer having an active terminal, which is obtained in the Process (7), by an amount such that a total amount of functional groups relative to the active terminal is less than 1 molar equivalent, and thereby forming the block copolymer Q and the block copolymer R;
- (9): adding an aromatic vinyl monomer to a solution that is obtained in the Process (8), and thereby forming the block copolymer P; and
- (10): collecting the block copolymer composition from a solution that is obtained in the Process (9).

* * * * *